(12) United States Patent
Schweiger

(10) Patent No.: US 7,929,150 B1
(45) Date of Patent: Apr. 19, 2011

(54) ALIGNMENT INTERFEROMETER TELESCOPE APPARATUS AND METHOD

(75) Inventor: Paul F. Schweiger, San Ramon, CA (US)

(73) Assignee: Lockheed Martin Corporation, Bethseda, MD (US)

( * ) Notice: Subject to any disclaimer, the term of this patent is extended or adjusted under 35 U.S.C. 154(b) by 0 days.

(21) Appl. No.: 12/901,462

(22) Filed: Oct. 8, 2010

Related U.S. Application Data

(62) Division of application No. 12/111,939, filed on Apr. 29, 2008, now Pat. No. 7,835,012.

(60) Provisional application No. 60/924,124, filed on May 1, 2007.

(51) Int. Cl.
*G01B 11/02* (2006.01)

(52) U.S. Cl. ............................................. 356/508

(58) Field of Classification Search .............. 356/138, 356/153, 508
See application file for complete search history.

(56) References Cited

U.S. PATENT DOCUMENTS

| | | | |
|---|---|---|---|
| 4,890,921 A | 1/1990 | Pond et al. | |
| 6,204,961 B1 * | 3/2001 | Anderson et al. | 359/353 |
| 6,301,007 B1 * | 10/2001 | Hanlon et al. | 356/400 |
| 6,331,904 B1 | 12/2001 | Daiber et al. | |
| 6,366,349 B1 * | 4/2002 | Houde-Walter | 356/153 |
| 6,825,977 B2 | 11/2004 | Sullivan | |
| 7,835,012 B1 * | 11/2010 | Schweiger | 356/508 |
| 2003/0227671 A1 * | 12/2003 | Sullivan | 359/368 |
| 2008/0212105 A1 | 9/2008 | Restaino et al. | |
| 2009/0051772 A1 | 2/2009 | Rhoads | |

OTHER PUBLICATIONS

Davidson Optronics, Inc., Autocollimating Alignment Telescope—D-275, website catalogue. http://www.davidsonoptronics.com/catD-275.htm, Apr. 6, 2003.
Davidson Optronics, Inc., Twyman & Green Interferometer, website catalogue. http://www.davidsonoptronics.com/catD-302.htm, Sep. 12, 2002.
Smith, Warren J., "Modern Optical Engineering The Design of Optical Systems $2^{nd}$ Edition", McGraw-Hill, Inc., San Francisco, CA, 1990. p. 24, 44-46, 337, 74.
Smith, Warren J., "Modern Lens Design a Resource Manual", McGraw-Hill, Inc., San Francisco, CA, 1992. p. 66.
Laikin, Milton, "Lens Design Third Edition, Revised and Expanded", Marcel Dekker, Inc., New York, NY, 2001. p. 36-37.
Edmund Optics, Inc. website catalogue. http://www.edmundoptics.com/onlinecatalog/displayproduct.cfm?productID=1811&search=1.
Born, Max & Wolf, Emil, "Principles of Optics $7^{th}$ (expanded) Edition", Cambridge University Press, New York, NY, 2003. p. 298.
Malacara, Daniel, "Optical Shop Testing Second Edition", John Wiley & Sons, Inc., New York, NY, 1992. p. 61.
Hecht, Eugene & Zajac, Alfred, "Optics", Addison-Wesley Publishing, Inc., Menlo Park, CA. 1979. p. 278.
Wyant, James, Notes from Optics-513, "Opical Testing and Testing Instrumentation Class", University of Arizona, 2005.

* cited by examiner

*Primary Examiner* — Patrick J Connolly
(74) *Attorney, Agent, or Firm* — McDermott Will & Emery LLP

(57) ABSTRACT

An alignment interferometer telescope apparatus comprises a coherent laser source, a first beam splitter, a reference spherical mirror, a light source, first and second reticles, and a second beam splitter. At an interference location within the apparatus, a reference laser wave and a test laser wave are allowed to interfere to produce a combined laser wave.

6 Claims, 15 Drawing Sheets

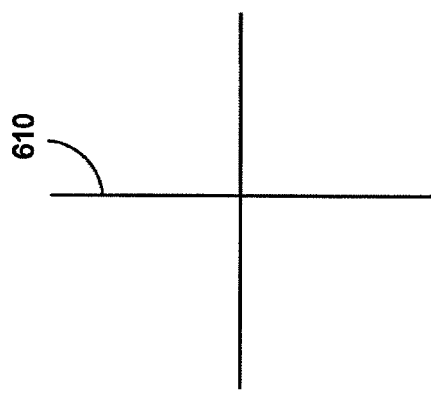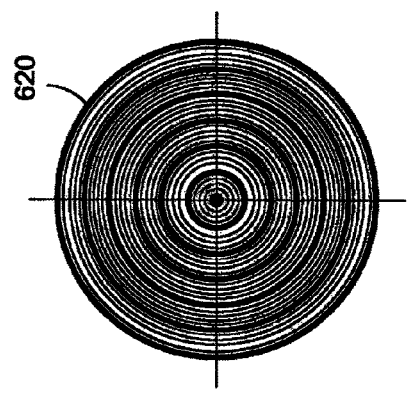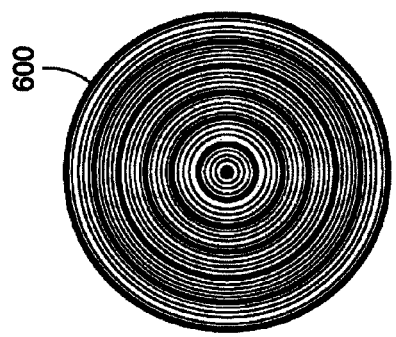
FIG. 6

ALIGNMENT INTERFEROMETER TELESCOPE APPARATUS AND METHOD

STATEMENT REGARDING FEDERALLY SPONSORED RESEARCH OR DEVELOPMENT

Not applicable.

CROSS-REFERENCES TO RELATED APPLICATIONS

This application is a divisional application of U.S. patent application Ser. No. 12/111,939, filed on Apr. 29, 2008, now U.S. Pat. No. 7,835,012 which claims the benefit of priority under 35 U.S.C. §119 from U.S. Provisional Patent Application Ser. No. 60/924,124, entitled "Alignment Telescope With Interferometer," filed on May 1, 2007, both of which are hereby incorporated by reference in their entirety for all purposes.

FIELD

The present invention generally relates to telescopes and, in particular, relates to alignment telescopes and interferometers.

BACKGROUND

Alignment telescopes are integral to most, if not all, optical sciences departments, equipment manufacturers, and optical integration houses. Typically alignment telescopes are a refractive type. Two lenses are displaced from one another within an optical path to focus on an observed image. Thus they can align objects along a common axis. In addition, some types of alignment telescopes have auto collimation features built into them. This feature allows them to measure angular error of reflective objects along the line of sight of the telescope.

SUMMARY

In accordance with one embodiment of the present invention, an alignment interferometer telescope ("AIT") is provided that merges an alignment telescope with a large unequal path interferometer. This combined instrument improves the fidelity of the alignment telescope's measurement capabilities. The design is based on a standard alignment telescope, so as to make the alignment interferometer telescope interchangeable with existing mounting hardware.

In accordance with one aspect of the present invention, an alignment interferometer telescope apparatus comprises a coherent laser source, a first beam splitter, a reference spherical mirror, a light source, first and second reticles, and a second beam splitter. The coherent laser source is configured to produce a coherent laser wave. The first beam splitter is configured to receive the coherent laser wave and to split the coherent laser wave into a reference path laser wave and into a test path laser wave. The test path laser wave is to be transmitted to an object outside the alignment telescope interferometer apparatus and to be returned to an interference location within the alignment interferometer telescope apparatus upon reflection from the object.

According to an aspect of the present invention, the reference spherical mirror is configured to receive the reference path laser wave and to reflect the reference path laser wave to the interference location. The light source is configured to produce a light. The first reticle is configured to receive the light and to project a projected image. The second reticle comprises a reference image. The second reticle is configured to receive the projected image and to superimpose the projected image with the reference image. The second beam splitter is configured to receive the projected image as a first beam. The first beam is to be transmitted to the object, to be returned to the second reticle upon reflection from the object, and to be superimposed with the reference image. The interference location is configured to combine the reference path laser wave and the test path laser wave to produce a combined laser wave.

According to another aspect of the present invention, a method for a telescope is provided. The method comprises producing a coherent laser wave, splitting the coherent laser wave into a reference path laser wave and into a test path laser wave, transmitting the test path laser wave to an object outside the telescope, receiving the test path laser wave at an interference location within the telescope upon reflection from the object, reflecting the reference path laser wave to the interference location, and combining the reference path laser wave and the test path laser wave to produce a combined laser wave.

According to an aspect of the invention, the method for a telescope also comprises producing a light, projecting an image from a first reticle with the light, transmitting the projected image to the object, receiving the projected image at a second reticle, and superimposing the projected image with a reference image from the second reticle.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It may be understood that both the foregoing general description and the following detailed description are exemplary and explanatory and are intended to provide further explanation of the invention as claimed.

In the following description, reference is made to the accompanying attachment that forms a part thereof, and in which are shown by way of illustration specific embodiments in which the invention may be practiced. It is to be understood that other embodiments may be utilized and changes may be made without departing from the scope of the present invention.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 6 illustrates reticle patterns in accordance with an exemplary embodiment of the present invention;

DETAILED DESCRIPTION

In the following detailed description, numerous specific details are set forth to provide a full understanding of the present invention. It will be apparent, however, to one of ordinary skill in the art that the present invention may be practiced without some of these specific details. In other instances, well-known structures and techniques have not been shown in detail to avoid unwarranted obscurement of the present invention.

Figure 1:
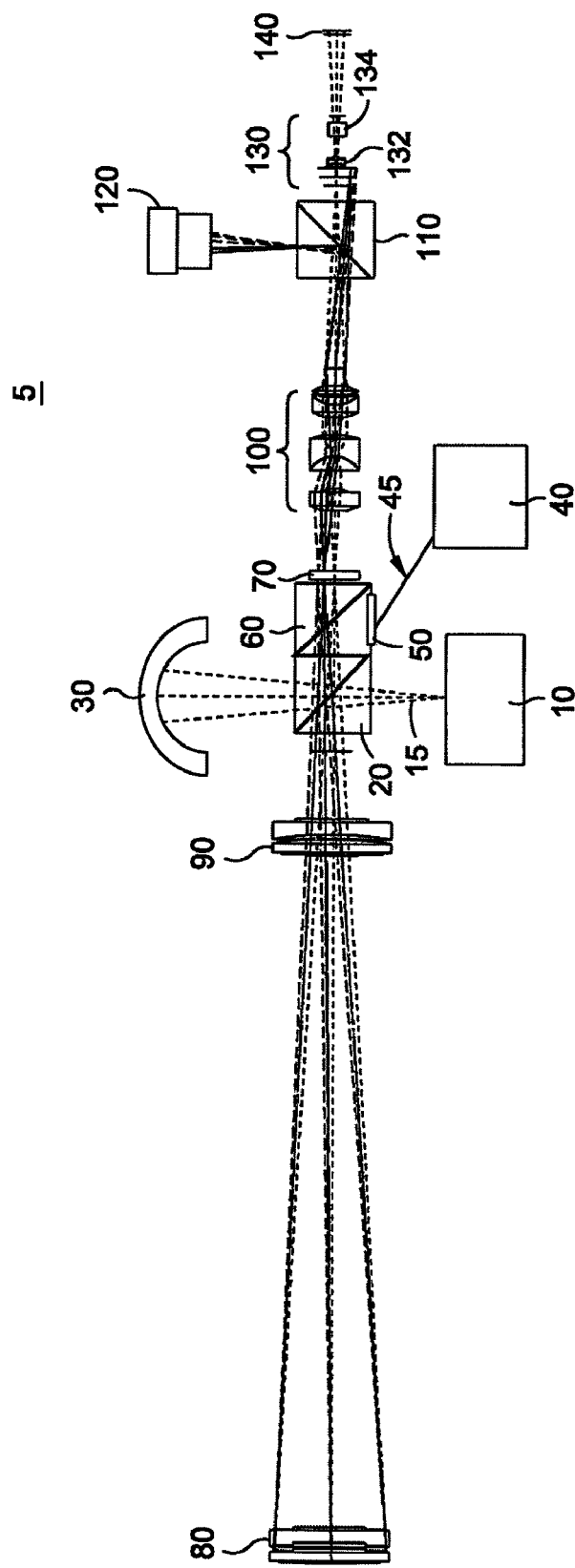
FIG. 1 is an illustration of an exemplary alignment interferometer telescope apparatus in accordance with an embodiment of the invention.

FIG. 1 illustrates an alignment interferometer telescope in accordance with an exemplary embodiment of the invention. Alignment interferometer telescope 5 may include laser source 10 to provide laser wave 15 to a first beam splitter 20. Laser source 10 may be any conventional laser generator such as a Helium-Neon laser generator, or a solid state laser. One of skill in the art would understand that laser wave 15, being used for interferometry, is preferably coherent. That is, the laser generator 10 produces a laser beam with a constant (or fairly constant) sine wave with a known amplitude and frequency.

Figure 9:
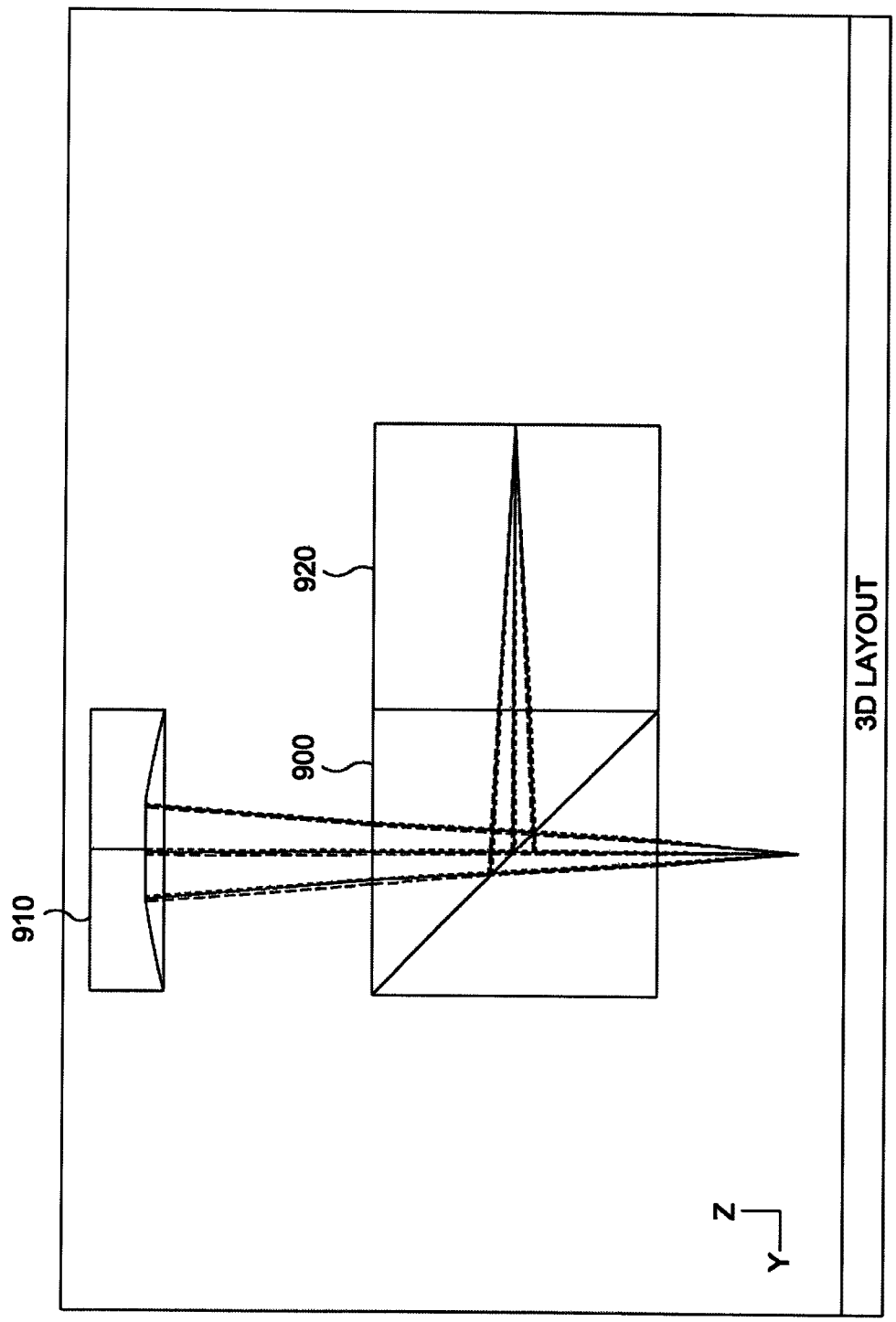
FIG. 9 illustrates exemplary beam splitter and reference spherical mirror optics in accordance with aspects of exemplary embodiments of the present invention.

Laser wave 15 is directed at beam splitter 20. In beam splitter 20 the laser wave 15 is split into two laser waves: a reference laser wave and a test laser wave. The reference laser wave is transmitted from beam splitter 20 to reference spherical mirror 30. (Reference spherical mirror 30 is also shown in FIG. 9 as element 910; further in that figure, the first beam splitter is shown as element 900, the second beam splitter is shown as element 920, and the optical/laser waves are shown entering element 900, and being reflected back to element 900 by mirror 910.) Upon reaching reference spherical mirror 30 the reference laser wave is reflected back to beam splitter 20, where it is redirected. The redirection of the reference laser wave at the first beam splitter 20 is discussed in further detail below following discussion of the test laser wave.

After splitting laser beam 15 the first beam splitter 20 transmits the test laser wave out through secondary lens 90 and objective lens 80. Objective lens 80 and secondary lens 90 may be conventional lenses suitable for telescopic observation. Lenses 80 and 90 are discussed in greater detail herein. The test laser wave continues in an outward direction from the alignment interferometer telescope until it strikes an object along the observation axis of the telescope. This object may be any number of things that are located outside alignment interferometer telescope 5, for example, a flat, a sphere, a lens, or another object that may be observed with an alignment telescope (the observed object is not illustrated in the figure).

Upon striking the object being observed the test laser wave is retro-reflected back to the telescope, where it travels back through objective lens 80 and secondary lens 90, to re-enter the first beam splitter 20. At a point within first beam splitter 20 the test laser wave and the reference laser wave intermingle. The point where they first mingle is approximately at the hypotenuse of a triangle created by picturing that the beam splitter is made of up two equal triangles as shown in FIG. 1. As used herein, intermingling describes the interference location, or the presence of each of the reference laser wave and the test laser wave in the same optical path at the same time. Interference may describe the interaction of the two waves, for instance, combining, beating, joining, merging, coalescing, or other similar actions. The two laser waves may be permitted to intermingle from about the hypotenuse of the first beam splitter 20 along an optical path to about the notch splitter 110.

Because the test laser wave and the reference laser wave travel different paths to reach the interference location, the individual sine wave of the reference laser wave in all likelihood is at least somewhat out-of-phase with the individual sine wave of the test laser wave. If the two sine waves are found to be perfectly in-sync at the interference location, then the two waves are combined to produce a combined wave with the greatest-possible amplitude. If the two sine waves are found to be perfectly out-of-sync at the interference location, then the two waves are combined to produce a flat wave, that is, a sine wave without any positive or negative amplitude or a "flat line." In most instances, however, the combined wave is somewhere between perfectly in-phase and perfectly out-of-phase.

The differences between the reference laser wave and the test laser wave may also be described as possessing constructive elements and/or destructive elements. That is, at the interference location, positive amplitudes of either sine wave are considered to be constructive, while negative amplitudes of either sine wave are considered to be destructive. Additional aspects of interference are described in greater detail herein.

The combined laser wave is permitted to travel along an optical path to reach notch splitter 110. Notch splitter 110 prevents harmful aspects of the laser light (e.g., the reference laser wave, the test laser wave, or the combined laser wave) from being sent to the eyepiece 120 to prevent possible injury to an observer. Eyepiece 120 may be a typical observation eyepiece fashioned for human comfort and/or it may include a camera mount and/or a charged coupled discharge device for taking photos including potentially digital photos.

At notch splitter 110 the laser wave is allowed to travel to pupil imaging module 130, where module 130 analyzes each of the sine waves from the reference laser wave, the test laser wave, and the combined laser wave. Through this analysis the pupil imaging module 130 produces a first pupil image that may be based upon the sine waves of the reference laser wave and/or the combined laser wave. It also produces a second pupil image that may be based upon the sine waves of the test laser wave and/or the combined laser wave. In additional exemplary embodiments the pupil images may be based upon the sine waves of at least one of the reference laser wave, the test laser wave and the combined laser wave. Alignment of the pupil images occurs automatically when the projected reticle 50 is centered within the reference reticle 70, as is explained in greater detail herein.

The analysis performed at pupil imaging section 130 may be done with a processor, a computer, with software, and/or with an algorithm. Further, the pupil imaging module 130 may include selectively adjustable components (including manually and/or automatically selectively adjustable components) for alignment/adjustment of the first and second pupil images. Selectively adjustable components may include, for example, mirrors, lenses, prisms, wedges, and/or windows. In various exemplary embodiments of the present invention, when the telescope apparatus is out-of-alignment, the first and second pupil images may be shown to not overlap or to only partially overlap, and when the telescope apparatus is properly aligned, the first and second pupil images may be shown to overlap or to substantially overlap.

The first and second pupil images are projected to a viewing plane 140 where the first and second pupil images may be observed for purposes of both alignment of the telescope and for intensity/brightness. If the individual waves of the reference laser wave and the test laser wave are mostly in-phase, the first and second pupil images approach a state of greatest overall intensity/brightness. When the individual waves of the reference laser wave and the test laser wave are mostly out-of-phase, the first and second pupil images approach a state of lesser overall intensity/brightness. The varying degrees of intensity/brightness of the first and second pupil images may be compared, as one skilled in the art would understand, by overlapping the pupils on a viewing plane and then noting the differences between produced fringes.

Figure 10:
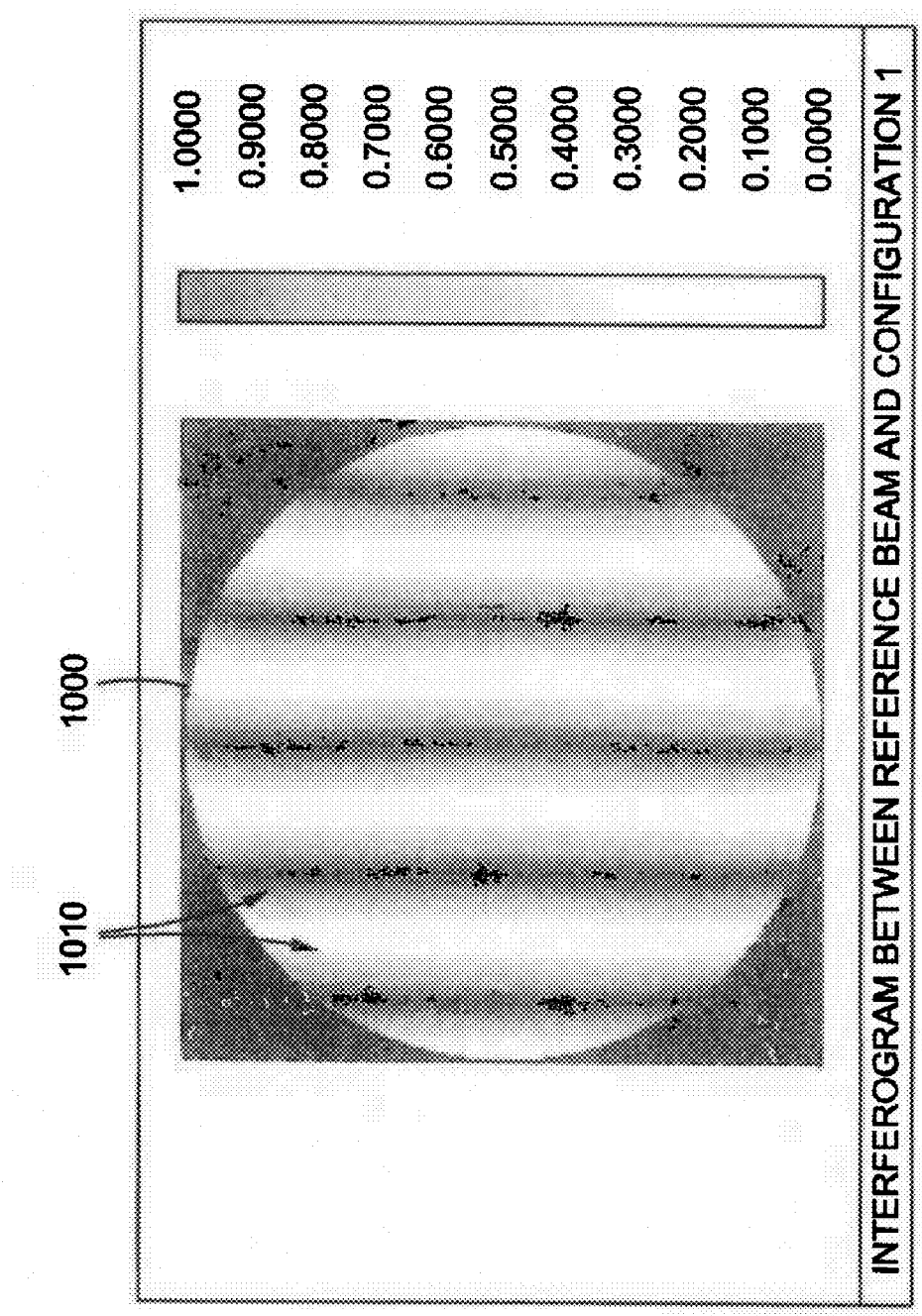
FIG. 10 illustrates interferometry fringes taken using an exemplary embodiment of the present invention.

An example of fringes produced by an exemplary embodiment of the present invention is shown in FIG. 10. Pupil images 1000 are projected to a viewing plane. The pupil images 1000 are displayed at the viewing plane, for example, the interferometer pupil image plane 140 shown in FIG. 1. The pupil images may be otherwise displayed for observation; for example, the pupil images may be displayed on a display monitor, or a video screen, or captured by a charged coupled discharge device, and/or they may be supplied to an eyepiece such as the eyepiece shown in FIG. 1. Once displayed the pupil images 1000 are observed for differences in the fringes 1010, or those sections of the pupil images 1000 shown by the alternating black and white stripes.

Once again referencing FIG. 1, light source 40 produces a light 45 that is transmitted through first reticle 50. When light 45 travels through first reticle 50 a projected image is produced, for instance the image 600 shown in FIG. 6. The light with the projected image is hereafter mostly referred to as a first beam. The first beam continues past first reticle 50 and into a second beam splitter 60. At beam splitter 60 the first beam is further transmitted out of the telescope apparatus through secondary lens 90 and objective lens 80.

The first beam then reflects from the previously discussed observed object that is external to the telescope apparatus and returns in a retro-reflection first through objective lens 80, then through secondary lens 90, back through the first and second beam splitters to arrive at a second reticle 70. Second reticle 70 is a focus/reference reticle and includes a reference image such as that shown in FIG. 6 as element 610.

In an additional exemplary embodiment of the present invention, the reticles 50, 70 may be selectively adjustable. For instance, at least one of the reticles 50, 70 may be selectably adjustable (or movable) to allow for displacement measurements. To implement an adjustable reticle, the focus position of the reticle is placed off of the beam splitters 20, 60 to allow access for a mechanical mounting. Two reticles are used at the location of reticle 70, one in each axis so that X & Y displacements can be measured independently. Micrometer adjustment mechanisms with their actuator knobs located outside the housing directly move the reticle to a desired position. Numbers on the micrometer provide offset. Unit magnification over all of focal positions and/or a mechanical compensator is required to translate the positional value to an object displacement, as one of skill in the art would comprehend. The reticles may also be automatically selectively adjustable; for instance, a computer may control the aforementioned through software, by a processor, and/or by an algorithm, as one of skill in the arm would comprehend.

Returning to FIG. 6, at second reticle 70 the projected image 600 from the first beam and the reference image 610 are superimposed to create image 620. If the optics of the telescope apparatus are properly aligned then the superimposed image 620 may be viewed through the eyepiece 120 with the crosshairs of the reference image 610 centered on the center-most concentric circle of the projected image 600. One of ordinary skill in the art would understand that at least one of the reticles 50 and/or 70, and/or their associated optics, and/or lens 80 and/or 90, may be fashioned so as to be selectively adjustable so as to align the superimposed image 620 in view of an object being observed.

Further as shown in FIG. 1, relay module 100 relays the previously discussed optical paths (to include the observation path and the laser interference path) to and from the second reticle 70 and the notch beam splitter 110. The relay module 100 is discussed in greater detail herein. One of ordinary skill in the art would comprehend various ways in which the relay system may be implemented.

Figure 2:
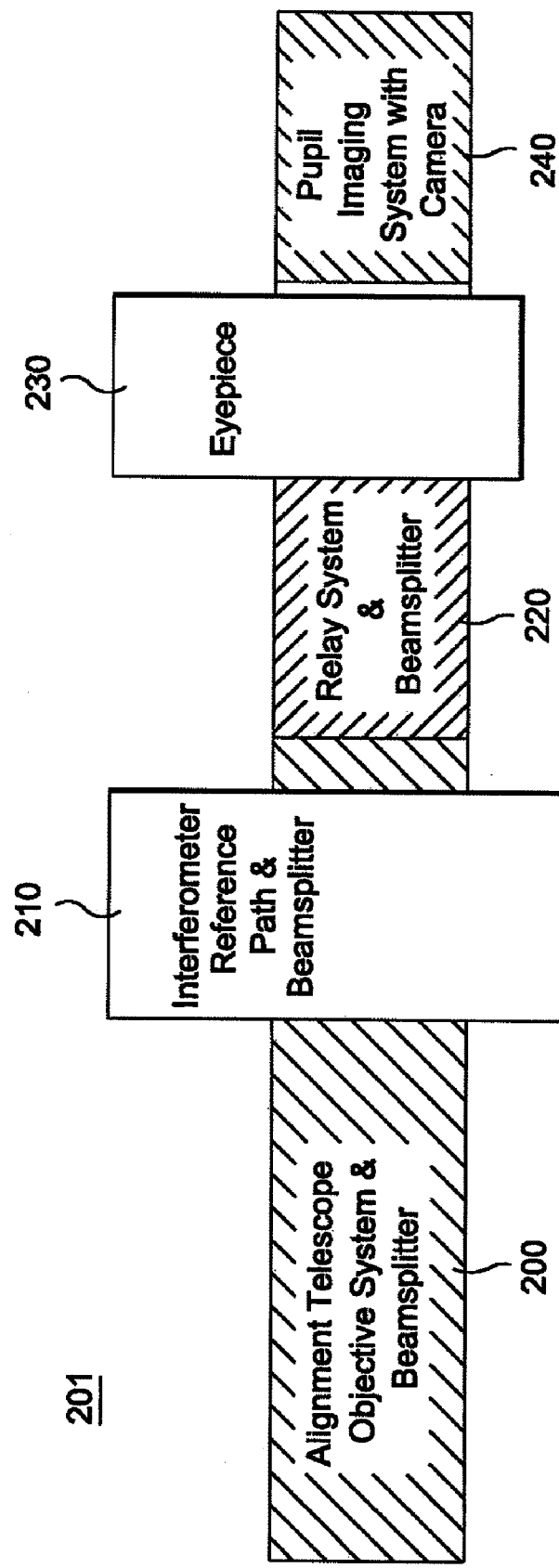
FIG. 2 is a block diagram of an exemplary alignment interferometer telescope apparatus in accordance with an embodiment of the invention.

FIG. 2 is a block diagram that illustrates a modular view of an exemplary embodiment of the present invention. An alignment interferometer telescope 201 includes an alignment telescope objective arrangement and beam splitter module 200, an interference reference path and beam splitter module 210, a relay and beam splitter module 220, an eyepiece module 230, and a pupil imaging module 240. These exemplary modules of the present invention are discussed in greater detail below.

An exemplary manner of making an embodiment of the present invention including the alignment telescope objective arrangement and beam splitter module uses a two-lens system as a basis for the overall objective system. Referring to FIG. 1, an outer, fixed objective lens 80 is used along with an inner, movable secondary lens 90. Each lens 80 and 90 consists of an air spaced achromat. The air spacing is to reduce ghosting due to a cemented lens interface especially when a laser is being used, such as the laser wave 15. For closest focus, the lenses 80 and 90 may be relatively close to each other, for instance with a separation of about 25 mm in mechanical mounting. At infinity focus the lenses 80 and 90 would be at their maximum separation, for example about the referenced 25 mm. Focusing between near-focus and infinity-focus is achieved by varying the secondary lens within the distance separating lenses 80 and 90. A simplified approach to understand the focusing technique is, at near focus, the secondary lens 90 collimates the reticle 70 and the objective lens 80 focuses the collimated light 45.

For infinity focus, the secondary lens 90 is closer to the reticle 70 and thus has little effect on the optical system. Hence the reticle 70 is at the focus of the objective lens 80, producing collimated light. The beam splitters 20 and 60 may be a cube design to minimize aberration, for ease of manufacturing, and for ease of mounting inside a barrel housing (not shown), and also to create perpendicular (or other known) surfaces to align the reticles 50 and 70 against. For example, in an exemplary embodiment of the present invention, one surface of a cube design beam splitter 60 may be used to mount the projection reticle 50 and another, perpendicular surface may be used to mount the reference reticle 70.

Materials for the transmission portions of the reticles 50 and 70 may be the same as the materials used for the transmission portions of the beam splitters 20 and 60 to minimize ghosting. A crosshair may be used for the reference reticle 70 and an illuminated ring pattern for the projected reticle 50, as shown in FIG. 6. Further as shown in FIG. 6, the projected image 600 includes multiple rings that may be equal to about one arc minute with a range of 30 arc minutes. The outer surface of the objective lens 80 is defined as the clear aperture (as the term "clear aperture" would be known to one of ordinary skill in the art), since this is the restricting optical surface.

The interferometer reference path & beam splitter module shown in FIG. 2 includes (as shown in FIG. 1) a laser source 10 for the laser wave 15. An exemplary embodiment of the present invention includes use of a single mode fiber (SMF) for about 633 nm. The cube beam splitter 20 splits the laser beam between reference and test laser waves. The reference laser wave transmits un-deviated through the beam splitter 20 while the test laser wave is reflected and transmitted through lenses 90 and 80 in a trajectory vector away from the telescope apparatus. The beam splitter 20 may be attached to the alignment telescope beam splitter 60. To reduce ghost reflection, both beam splitters 20 and 60 may be made of the same transmission material and may be optically in contact with one another. A good anti-reflective (AR) coating optimized at 633 nm may be used on the outer surfaces where the reticles 50 and 70 are not attached (since the reticles 50 and 70 are at the focus, coatings may induce surface defects that may result in poor image quality).

In an exemplary embodiment of the present invention, the retro reflector mirror 30 may be a coated spherical surface and be oversized to allow for easy alignment and to induce tilt fringes. An f-number slightly faster than the objective system shall be used to facilitate ease of alignment. Typical SMF output is F/5 which requires a light stop to match the objective system, and to reduce stray light. Design concepts include a complete path that goes through both beam splitters 20 and 60. Design concepts should perform over a 633 nm wavelength. An interference location includes at least a portion of beam splitters 20 and 60, and interference takes place where the two beams, i.e., the reference and test laser waves, each coincide in the same optical path at the same time. A portion of this interference location includes the general location of the hypotenuse of beams splitter 20 and most of the optical path of beam splitter 60.

FIG. 2 also displays the relay system & beam splitter module, and the following description provides an exemplary manner of making this module as an embodiment of the present invention. The relay system 100 is shown in FIG. 1, and allows image access to both the eyepiece 120 and the pupil imaging system 130. Magnification may be on the order of 1× to allow the eye to resolve 5 arc seconds to null the alignment telescope reticles. WFE may be in single pass since at least some exemplary embodiments of the present invention only use single pass.

In exemplary embodiments of the present invention, pupil size may be approximately 4 mm in diameter to allow 1:1 imaging onto a camera (not shown) using the pupil imaging system. In various embodiments, the beam splitters 20 and 60 are a cube design to facilitate mounting and reduce aberrations. A notch filter 110 is incorporated in the beam splitter to limit and/or prevent the amount of laser light reaching an observer's eye as a laser safety requirement. The focal point (not shown) is beyond the beam splitters 20, 60 in reference to the relay system 100 to reduce beam splitter surface quality effects on the image.

FIG. 2 also includes a pupil imaging module. In exemplary embodiments of the present invention, the pupil imaging module includes a camera, and images the pupil images (otherwise known as interferograms) over the entire focusing range onto a charged coupling device (CCD) imaging surface (such as a digital camera). CCD camera size may be 768×494 pixels with pixel pitch of 8.4×9.8 microns, for example, or other known values for a standard CCD camera. Pupil imaging size may be 4 mm in diameter to fill the CCD image surface over the entire focusing range. Pupil lenses should be located at least 20 mm from the CCD imaging surface and at least 5 mm from the beam splitter 60 for mechanical mounting for preferred pupil imaging. Operational concepts include having a two-element air space lens system to collimate the pupil image and another two-element air space lens system to image the pupil image(s) onto the CCD.

FIGS. 1 and 2 also include an eyepiece or an eyepiece module. The eyepiece 120 may be a commercial off the shelf design with a minimum of 12.5 mm of eye relief to accommodate persons who wear eyeglasses, and should image at least ±1 degree. Its requirements may be based on the magnification required to view better than the 5 arc seconds of a relayed image.

In determining the optical design process, optical element starting points were laid out based on first order design principles using the following equations. In the below equations, each doublet is simplified into a singlet and paraxial equations are used. The below equations may be used to determine the powers of the lenses 80 and 90. These state the following equations to derive their corresponding components/quantities:

Objective Lens Optical Power $$\Phi_A = \frac{(ms - md - s')}{msd}$$

Secondary Lens Optical Power $$\Phi_B = \frac{(d - ms + s')}{ds'}$$

$$F/\# = f/CA \qquad \text{F-Number}$$

Magnification $$m = \frac{s'}{s}$$

s—Object to objective lens (principal plane)
s'—Secondary lens (principal plane) to image plane
d—Distance between objective and secondary lenses (principal planes)
f—Effective focal length
CA—Clear aperture
All values are positive except for s, which is negative. Based on the overall length of the telescope and the magnifications needed for the modules stated in the block diagram of FIG. 2, each module's optics, element power, and locations may be calculated. (Note that these values are starting points for exemplary embodiments of the present invention, and are not meant to necessarily be final design values.) For the objective lens system (ignoring the beam splitters 20, 60) and using the near focus of 400 mm for s, 200 mm for d, 100 mm for s' and 35 mm for the CA. Inserting these values into equations 1-4, the power for the lenses are:

$$\Phi_{objective}=0.0025 \text{ 1/mm } (f_A=400 \text{ mm})$$

$$\Phi_{secondary}=0.0100 \text{ 1/mm } (f_B=100 \text{ mm})$$

For the relay system 100 based on the allocated thickness and 1:1 magnification, a two lens achromatic system may be used. The first lens collimates the objective system image point while the second one re-focuses it. The standard rule of thumb for a glass plate in focusing space, to simulate the beam splitter 20, 60, is to extend the focal length by approximately ⅓ the thickness of the glass, based on an index of 1.5. A 25.4 mm cube beam splitter 20, 60 yields a focal shift of 8.47 mm. Using a separation of 12.7 mm, relay track length of 120 mm, 8.47 mm due to the beam splitter 20, 60 and the required magnification, the focal length of the two lenses are equal. The focal length for the two lenses may be calculated to be:

$$f_A=120-8.47-12.7-(f_A)$$

$$f_A=49 \text{ mm}$$

$$f_B=49 \text{ mm}$$

For the pupil imaging system 130, two lenses 132 and 134 image the interferogram (pupil images) onto a plane 140, whether that plane is a viewing plane, a CCD camera, or other image representation for observation. In an exemplary embodiment of the present invention, after imaging through the relay system 100 and beam splitter 20, 60, the pupil image would be located approximately 15 mm from the beam splitter 20, 60. To image the pupil image/interferogram a further distance from the beam splitter 20, 60 (that is, to reach the CCD camera), a relay system (such as relay system 100) is used. Using a track length of 100 mm including the beam splitter 20, 60 and pupil location, 8.47 mm for the beam splitter 20, 60, 12.7 mm separation and 1:1 magnification, the focal length of the two lenses 132 and 134 are equal. The two lenses are therefore calculated to be:

$$2(f_A)=100-8.47-12.7$$

$$f_A=f_B=39 \text{ mm}$$

The design process begins with the objective system comprising lenses 80 and 90. Subsequent sections are added later on so that the combined system's performance can be verified as each step is completed. To start the objective system, a search of known lens design was performed. An ideal starting lens was found in Warren Smith's "Modern Lens Design a Reference Manual" (McGraw-Hill, Inc. San Francisco, Calif., 1992. p 66). The lens is a Fraunhofer cemented achromatic objective made from common and easy to manufacture materials with the following specifications:

F/# 7
Half FOV—1 degree
Effective Focal Length (EFL)—99.98 mm
CA—14.4 mm
Material—BK7 and SF1

A single pass system was modeled with the object set for infinity, field set to 0, 0.7 and 1 degree, and the wavelengths set to visible (486.13, 656.27, 587.56 nm) and Helium Neon (HeNe 632.8 nm). The visible wavelengths were equally weighted along with the HeNe. An on-axis field was weighted 10 times higher than the other fields since the interferometer works mainly on-axis and requires good performance. First the lens 90 was scaled to have the required 35 mm clear aperture. Then it was duplicated and inserted behind the first objective lens 80 as the secondary lens (90). The beam splitter 20, 60 was then added to the model with its back surface as the focus surface. Its total thickness of 50.8 mm incorporated both the alignment telescope and the interferometer beam splitters 20, 60. Variables were all the Radius of Curvatures (RoC).

The lens separations were set as in the first order design with an object at infinity. At this time the optimization was used to find a solution for this setup. Optimization figure of merit was based on the RMS wavefront over all wavelengths and fields. To fine tune the solution, the cement surfaces are replaced with a fixed separation of 1 mm and both de-cemented RoC were allowed to vary. When the performance was diffraction limited, configurations were added to allow optimization over the focusing range. Six different ranges were used, infinity, 10,000, 5,000, 1,000, 500 and 400 mm.

Pickup and thickness limits were used to control the travel range of the secondary lens 90. This technique allows for mechanical mounting distance between the objective lenses 80, 90 and the beam splitters 20, 60. New operands were created to incorporate the configurations for merit function. Optimization was quick and resulted in an objective system having a worst-case WFE of 0.3 λRMS over all the tested ranges, tested configurations, and tested wavelengths.

In an exemplary manner of making an embodiment of the present invention, the interferometer reference path and beam splitters 20, 60 may be added to the optical model after the objective module. Not that the interferometer path shares the same optical path as the alignment telescope's beam splitters 20, 60 and focal point. Since the reference path is the reference for the interferometer, it needs to be better than the test path. A performance factor of 4 was chosen between the reference and test paths.

Given that an exemplary embodiment of the present invention utilized a monochromatic interferometer, only a HeNe wavelength was required. The calculated performance for the reference beam was 0.05 λPV at 633 nm. To slightly overfill the pupil size of the test laser wave an F/6.0 beam was used. Design accommodations took into account mounting and alignment of the SMF fiber (for example, the fiber 430 shown in FIG. 4, and as shown being aligned in FIG. 5) and reference spherical mirror 30. The SMF fiber (for instance, the fiber shown as element 430 in FIG. 4) was mounted in the range of 12.7 mm from the first surface of the beam splitter 20, 60 as shown in FIG. 5. In FIG. 5, the SMF fiber output 500 is shown emitting to the surface of the beam splitter 20, with the reflected reference laser wave (retro-return image) shown as element 510. The air space between the fiber output 500 and the beam splitter 20 allowed room for light baffles to reduce stray light emanating from the SMF fiber and for mechanical adjustments. 20 mm of air spacing was allocated for the reference spherical mirror 30 (shown in FIG. 1) to accommodate mechanical mounting and adjustments. To minimize manufacturing costs, a spherical surface for the mirror 30 was utilized.

A single pass system was modeled with the fiber 500 (shown in FIG. 5) set at 12.7 mm from the first beam splitter 20, field set to 0, 0.35 and 0.5 degree, and the wavelengths set to HeNe (632.8 nm). On-axis field was weighted 10 times higher than the other fields since the interferometer reference path works on-axis. The F/6.0 beam was set using a dummy surface after the fiber set to a thickness of 6 mm and a CA of 1. A negative thickness pickup on the next surface returned the beam to the source.

The previous is a standard modeling technique that allows control of the f-number without interfering with the system's setup and reduces optimization complexity. The RoC for the reference spherical mirror 30 (shown in FIG. 1) was estimated at the distance from the SMF fiber to the retro return path to be 60 mm concave. Viewing the model layout then allowed for refining the reference spherical mirror 30 by manually adjusting it until it looked that the focus of the reference spherical mirror 30 was at the surface of beam splitter 20.

Variables included the retro reflector RoC and the separations of the retro sphere and SMF fiber to the beam splitter 20. Constraints were placed on the thicknesses to control their range. The material for the beam splitters 20, 60 was identical to the materials used for the objective system. Figure of merit was based on the RMS wavefront over all fields. Optimization was quick and resulted in the interferometer reference system having a worst-case on-axis WFE of $0.0545\lambda$ PV over the entire field. The performance goal was $\leq 0.05\lambda$ peak-to-valley (PV). In order to improve the performance, a conic constant or an increase in f-number would be required. To minimize manufacturing cost and complexity, the as-designed performance is acceptable. If the performance is rounded ($0.05\lambda$) it meets self-imposed performance goals.

Referring to FIG. 10 shows that an imaged pupil interferogram (or two pupil images contrasted with one another). Note that the scale factor in the figure has the fringe/wave value set to one. Since the exemplary embodiment of the present invention utilized a single pass system the retro beam does not return to the same starting point.

The below table shows requirements for an exemplary embodiment of a reference spherical mirror used as part of the present invention (such as element 30 shown in FIG. 1). While the table shows various requirements, the stated requirements apply only in the strictest sense to the example given. One skilled in the art would comprehend that other reference spherical mirrors could be utilized in different embodiments of the present invention, and that these other reference spherical mirrors may utilize at least some varied requirements along with some of the requirements listed in the below table.

| Reference Spherical Mirror Requirements For An Exemplary Embodiment of the Present Invention | | | | |
|---|---|---|---|---|
| | | | Verification Method | |
| Requirement | Requirement | Units | Design | Units |
| Optical System [Alignment Telescope & Interferometer] | | | | |
| Near Focus in Front of Objective Lens | 406.4 | mm | 400 | mm |
| Far Focus in Front of Objective Lens | infinity | NA | Infinity | NA |
| Clear Aperture at Objective Lens | $\geq 35$ | mm | 35 | mm |
| No Ghosting the Interferes with the System's Performance | Yes | NA | | x |
| Alignment Telescope | | | | |
| WFE (single pass from object to eyepiece over field) | $\lambda/3$ RMS ($\lambda$ = all wavelengths) | nm | 0.12 | waves |
| F/# (through focusing range) | 5-8 | NA | 7 | NA |
| Path 1: Object to Eyepiece | Yes | NA | x | |
| Path 2: Projected Reticle to Retro Surface to Eyepiece | Yes | NA | x | |
| Spectral Bandwidth | 500-650 | nm | 486-656 | nm |
| Adapter for Color Filter | Yes | NA | x | |
| Full Field of View | $\geq 1$ | Degree | x | x |
| Null | <5 | arc seconds | | |
| Interferometer | | | | |
| WFE (reference to test path) | $\leq \lambda/5$ PV ($\lambda$ = 633 nm) | nm | 0.05 | waves |
| Spectral Bandwidth | 633 | nm | 633 | nm |
| Path 1: Source to Reference Retro Sphere to Camera | Yes | NA | yes | NA |
| Path 2: Source to Retro Surface to Camera | Yes | NA | x | |
| Fringe Visibility for 4 - 100% Reflection | 0.25 | NA | | x |
| Full Field of View | 0.001 | Degree | 0.001 | degrees |

The relay system and beam splitter module shown in FIG. 2 is the next module to be integrated into an exemplary manner of making an embodiment of the present invention. A search for a known lens to fit the first order design was previously performed. Since the objective lens 80, 90 described above worked well as an imager for an infinite object, a similar lens was used for the relay system. The same materials and steps used above in relation to the objective lenses 80, 90 were re-utilized for relay system 100 lenses. Re-using the same materials and steps allows for quality of optical paths, and also helps to control manufacturing costs.

Each lens for the relay system 100 (shown in FIG. 1) was separately optimized for their respective focal length (f=49 mm) as defined in the first order design. The general requirements (FOV and wavelengths) were identical to that for the objective system except the weighting for the HeNe wavelength was made equal with the other wavelengths. Because interference happens at the hypotenuse of the interferometer beam splitter 20, the relay system 100 is common to both beams and does not require high precision. Variables were all of the RoC and the thicknesses. The operands that made up the figure of merit were the RMS wavefront for all fields and wavelengths.

After these separate lenses were optimized, they were integrated onto the end of the objective system model, with their positive lenses facing each other. The air separations keep to the first order design values. Additionally, a reticle glass plate was attached to the objective system beam splitter 60 along with a beam splitter 20 near the relayed focus. The beam splitter 60 splits the beam between the eyepiece and the interferometer camera that is a part of pupil imaging module 130. Only the through-path of the relay beam splitter was modeled. It was not necessary to model the reflected path separately since the amount of glass that both paths see is the same, only a parity changes.

The hypotenuse of beam splitter 60 is important for alignment requirements since the reflected beam undertakes a two times angular error deviation. A separation of at least 5 mm was used between the beam splitter 60 and focus relayed by relay module 100. The reason for this spacing is to eliminate cost and manufacturing complexity to the beam splitter 60. When a beam focuses on an optical surface, the surface quality (scratch/dig) of that surface is required to be very tight (10/5 or better) to eliminate blotches in the image.

With the Depth of Focus (DOF) for the F/7 beam, worst-case, at 0.064 mm (5), $$DOF = 2\lambda F/\#^2$$

$$DOF = 0.064 \text{ mm}$$

the separation is over 77 times that of the Raleigh $\lambda/4$ DOF range. Surface quality for the two surfaces on the beam splitter that are used can now be loosened. For the reticle 70, a standard plate size was modeled, 0.062 inch thick made from fused silica. The beam splitter 60 was also made from fused silica since it is a good material for fabrication and handling. Variables were all of the RoC and thicknesses. Constraints were used in the operands to limit the motion of the variable. These were the allowed total track length of 120 mm, magnification of 1:1, pupil size and location and beam splitter 60 distance to relay focus of approximately 5 mm.

With the setup complete, the optimization was turned on and based on the RMS wavefront over all fields and wavelengths. Optimization for this block required manual guidance to prevent the system from getting caught in local minima or creating an unobtainable design. The optimization technique was similar to the objective system. First the cemented doublets were optimized, then the cement was removed and the two de-cemented surfaces were allowed to vary. Next the thicknesses and air spacing were allowed to vary.

Several final designs were evaluated for performance and manufacture-ability. These designs included two-, three-, and four-element designs. A quick trade study showed best performance and manufacturability was the four-element design. One of the parameters in the trade study was the location of the exit pupil over all of the focus positions at the HeNe wavelength. This is the location that the pupil imaging system 130 images onto the CCD camera at plane 140. Large variations in position result in the pupil imaging system 130 lenses working harder and thus having tighter tolerances. With the 4-element design the pupil location varies by less than 0.0001 mm, and it has a diameter of 6 mm which almost fits the CCD camera requirement of 4 mm.

The performance of the relay system described above has a worst-case WFE of 0.256$\lambda$ RMS over all tested configurations, tested fields and tested wavelengths. A feature of an embodiment of the present invention included the relay system 100 flipping the viewed object upside down. The next optical modules, the eyepiece and pupil imaging modules, flip the image once more so that a viewer views an upright image.

During testing of an embodiment of the present invention, it was discovered that performance was improved when the overall track length of the alignment interferometer telescope apparatus was grown to 132 mm, which is 12 mm longer than an initially derived error budget of 120 $\mu$m, Although this directly affects the overall length of the apparatus, the performance increase was found to be substantial. For instance, magnification comes in at 1.25:1, which is close to the 1:1 ratio required by an initial error budget. The resulting image size is 5.26 mm in radius with a pupil radius size of 3.0 to 3.2 mm over all focal positions. For the pupil imaging system the magnification is almost 1:1 so the optical design remains straightforward.

The pupil imaging system with camera is the final module to be included into an exemplary manner of making an embodiment of the present invention. As with the relay block 100, the pupil imaging system 130 is actually a relay system, except it images the pupil images onto a plane 140 to be viewed by a camera or other device. The intermediate pupil image lies 30 mm before the relay beam splitter 60 as measured from the relay system 100. Using the same lens starting point as with the last sections (as described above in relation to the relay system and beam splitter module), the cemented lens 132, 134 is incorporated into the model. The lens 132, 134 design was initially optimized for the focal length ($f_1 = 39$ mm) as determine in the derived requirements. In this process, the cemented interface was removed as before. Then the lenses 132, 134 were inserted into the model and duplicated to produce the typical two-lens relay system as stated above.

Control of the optimization was different since the camera was imaging the pupil at plane 140, and not the focused image. A single real-ray trace at the y axis limit was used to control the pupil image size in each configuration, since the system is rotationally symmetric. The location of the pupil was established using a fixed distance (25 mm) from the last lens to the camera and a total track control of 53 mm. This allowed for mechanical mounting and imaging onto the CCD where the CCD sits inside of a camera body.

To solve for the actual pupil location, a pupil solve was used on the camera pupil imaging surface 140. After the solve, an ideal lens was inserted to focus the system. Optical programs prefer to have a focused point at the end of the model. They optimize better, are less prone to uncontrolled optimization and most of their analysis tools are based on focal systems. For each configuration, operands set the targeted pupil solve thickness to zero. The focal length for the ideal lens was allowed to vary since its location was only needed for optimization purposes. Afterwards, this lens can be removed or ignored without affecting the pupil imaging onto the camera.

Ideally, the camera would not need to be focused as the objective system imaged at different distances. Variables were the RoC and thicknesses of all the lenses. General parameters were the HeNe wavelength and an on-axis field. A slight field of 0.1 degrees was used for ease of alignment. Optimization required handholding to bring about the best solution. During the optimization, two of the four lenses had minimum effect on the ray bending, so they were removed, resulting in a two-element design. Since only one wavelength is required in the pupil imaging module, only one type of glass is required to make the module work. All of the glasses for the lenses 132, 134 were changed to silica for ease of manufacturing, and then re-optimized with only slight degradation in performance. Being in imaging space after interference has taken place; this pupil imaging module does not require exceptional optical performance. The resulting performance of the pupil imaging system with camera was a worst-case WFE of 0.036λ. RMS at the pupil image on axis for HeNe wavelength.

Figure 8:
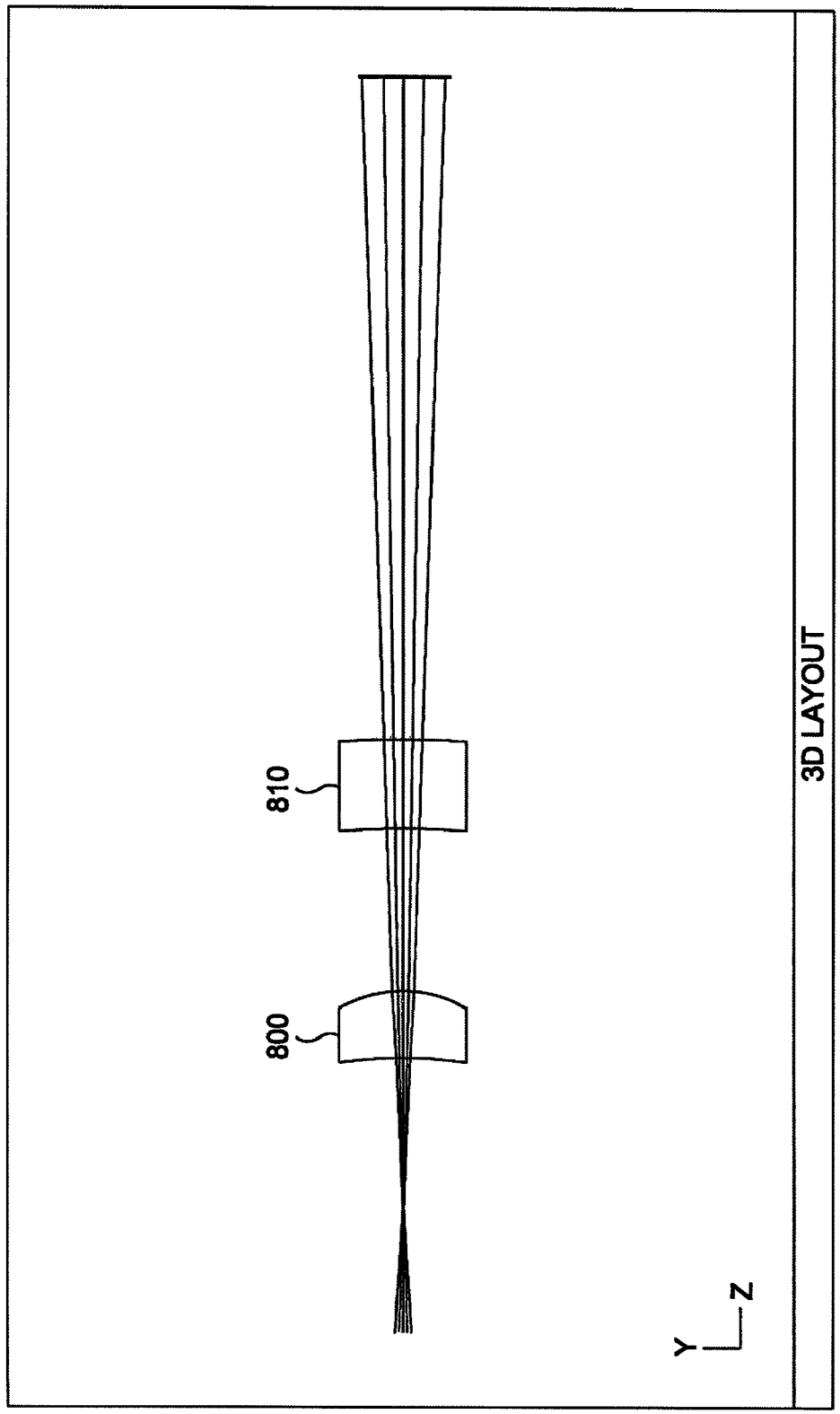
FIG. 8 illustrates exemplary pupil image optics in accordance with aspects of an exemplary embodiment of the present invention.

The resulting pupil imaging system is shown in FIG. 8 with first lens 800 and second lens 810. Overall track length of the pupil imaging system is 51 mm from relay focus point to the pupil image. The derived requirement was 53 mm to maintain the overall apparatus length. During design the location of the pupil focus varied at best optimization by 1.6 mm. To maintain best focus of the interferogram, the camera should be adjustable. A manual focus adjustment with ±6 mm will allow for plenty of margin and to correct for alignment errors.

The below table shows requirements for an exemplary embodiment of a pupil imaging module used as part of the present invention (such as element 130 shown in FIG. 1). While the table shows various requirements, the stated requirements apply in the strictest sense only to the example given. One skilled in the art would comprehend that other pupil imaging systems could be utilized in different embodiments of the present invention, and that these other pupil imaging modules would utilize at least some varied requirements along with perhaps some of the requirements listed in the below table.

diagram; 3) arc minute resolution over ±30 arc minutes; and 4) arc second resolution over 10 arc seconds.

Figure 7:
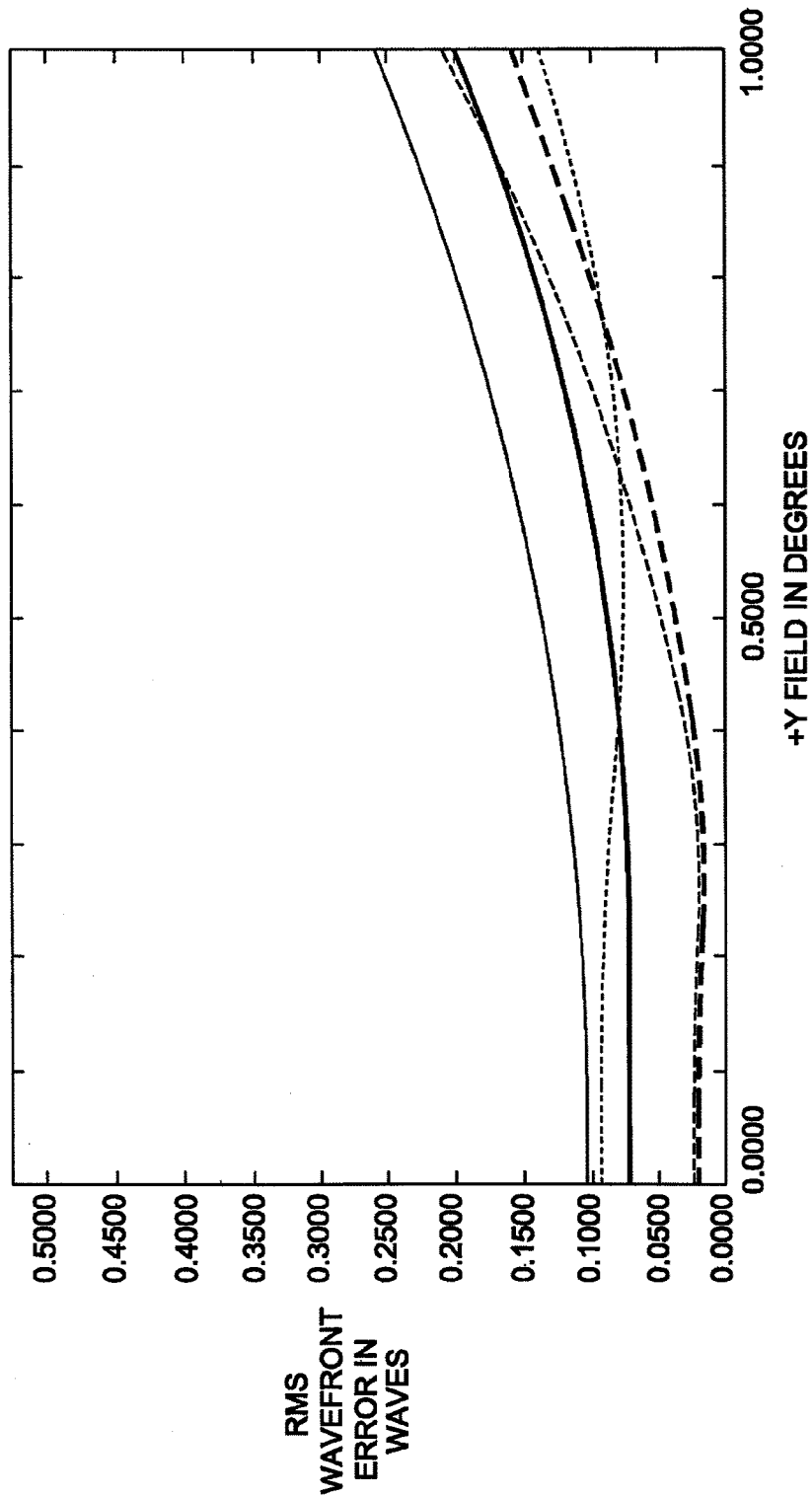
FIG. 7 is a graph of results obtained using an exemplary embodiment of the present invention.

WFE was determined by evaluating either the Strehl ratio or the RMS WFE over the entire field for both single and double pass models. Single pass was used to determine the optical performance when viewing an object directly as when establishing bore sight. The resulting single pass WFE performance is shown in FIG. 7. As shown in the figure, RMS wavefront error (WFE) is compared to a varying field. That is, performance is plotted over an entire field consisting of one degree. At the very edge of the one-degree field, performance is slightly degraded. However, there is no color separation, so the image would only appear slightly dimmer to the human eye. The human eye would automatically accommodate this loss in signal and fill in the image resulting in good performance as viewed over the entire field.

A double pass model was used to determine the performance when the projected reticle 70 (shown in FIG. 1) was sent out, retro reflected and returned through the optical system. The model analysis was different than with the single pass. In this case, the projected reticle 70 is on-axis with a radius of 4.3 mm. An external flat minor was tilted about the measurement range of 30 arc minutes to determine the performance. The effect was that the center dot of the reticle pattern moves to the edge of the 30 arc minute range and the Pupil Imaging System Requirements for an Embodiment of the Present Invention

| Requirement | Requirement | Units | Verification Method Design | Units |
|---|---|---|---|---|
| Optical System [Alignment Telescope & Interferometer] | | | | |
| Near Focus in Front of Objective Lens | 406.4 | mm | 400 | mm |
| Far Focus in Front of Objective Lens | infinity | NA | Infinity | NA |
| Clear Aperture at Objective Lens | ≥35 | mm | 35 | mm |
| No Ghosting the Interferes with the System's Performance | Yes | NA | | x |
| Alignment Telescope | | | | |
| WFE (single pass from object to eyepiece over field) | λ/3 RMS (λ = all wavelengths) | nm | 0.12 | waves |
| F/# (through focusing range) | 5-8 | NA | 7 | NA |
| Path 1: Object to Eyepiece | Yes | NA | yes | NA |
| Path 2: Projected Reticle to Retro Surface to Eyepiece | Yes | NA | yes | NA |
| Spectral Bandwidth | 500-650 | nm | 486-656 | nm |
| Adapter for Color Filter | Yes | NA | x | |
| Full Field of View | ≥1 | Degree | 1 | degrees |
| Null | <5 | arc seconds | | |
| Interferometer | | | | |
| WFE (reference to test path) | ≤λ/5 PV (λ = 633 nm) | nm | 0.05 | waves |
| Spectral Bandwidth | 633 | nm | 633 | nm |
| Path 1: Source to Reference Retro Sphere to Camera | Yes | NA | yes | NA |
| Path 2: Source to Retro Surface to Camera | Yes | NA | yes | NA |
| Fringe Visibility for 4 - 100% Reflection | 0.25 | NA | | x |
| Full Field of View | 0.001 | Degree | 0.001 | degrees |

For the eyepiece, for example the eyepiece shown in FIG. 1 as element 120, no design was created since there are multitudes of commercial off the shelf versions available.

The performance of an embodiment of the present invention including the alignment telescope portion was determined over all wavelengths and fields for single and/or (depending on operation) double pass models, including evaluation of at least: 1) the Strehl Ratio through system; 2) imaging performance (Polychromatic Strehl), OPD and spot edge to the center. The angular motion, of 30 arc minutes, is at the mirror, resulting in a 2:1 deviation to mirror angle. Since the system is rotationally symmetrical, only one tilt axis was required. To determine the performance, the polychromatic Strehl was analyzed and then the polychromatic RMS WFE was calculated. The following calculation for the RMS WFE was used:

$$\text{Strehl} = (1 - 2\pi^2 \omega^2)^2$$

Rearranging the equation to solve for ω(RMS WFE), the equation is $$\omega = \left( \frac{1 - \sqrt{Strehl}}{2\pi^2} \right)^{\frac{1}{2}}$$

The resulting polychromatic Strehl ratio across a 4.3 mm field included good results. Throughout the entire range, the projected dot possessed good image quality. The dots were made using all of the designed wavelengths. Since there is no color separation the projection reticle 70 can be used with color filters without any degradation in performance. The lateral color over the angular range of 30 arc minutes is well within the airy disk, as one skilled in the art would readily comprehend. To finish out the WFE performance for the AIT design, the OPD and spot diagrams were evaluated for both single and double pass.

For single pass, each plot has all wavelengths and fields for a specific configuration. In tests over a range from 400 nm to infinite (including 10,000 nm, 5,000 nm, 1,000 nm, and 500 nm fields), both the spot and OPD showed that optical performance was good and varied extremely little over the entire focusing range. Although the system is not diffraction limited, performance is actually excellent for its intended use as an optical imager with the eye as the detector.

To determine the size of the projected reticle pattern, and the ability to visually see 30 arc minutes of motion, a parametric analysis was performed. The double pass model was used with the flat mirror being tilted at one-minute intervals. Displacements at the relay focus were recorded and evaluated for uniformity and overall distance. Each one-minute interval resulted in a displacement of 0.175 mm from the previous one. For a 30 arc minute deviation the maximum displacement at the relay image plane is 5.26 mm. With a standard 10× eyepiece, each 1-arc minute and the entire range of 30 arc minutes are easily viewable by the eye.

Nulling of the projected reticle's center spot to the reference reticle crosshair to ≦5 arc seconds required the AIT system have magnification sufficient for the eye to distinguish 5 arc seconds of motion. FIG. 6, element 620, shows the null alignment of the reticles. The projected reticle dot is centered on the reference reticle crosshair.

A parametric study similar to the 30 arc minute analysis was performed. The range of tilt in the flat mirror was 10 arc seconds at 1-arc second intervals. Each one-second interval resulted in a displacement of 0.0029 mm from the previous one, or ⅙₀ of that established for each one-minute interval. For a 10 arc minute deviation the maximum displacement at the relay image plane is 0.029 mm. With a standard 10× eyepiece, each 1 arc second interval would result in a 0.029 mm motion that can be distinguishable. But with the requirement of 5 arc seconds, the motion is 0.145 mm, which is easily detectable. In addition, the eye is excellent at distinguishing spatial uniformity such as the image created by the overlapping of the projected reticle central dot to the reference reticle crosshair. The AIT will be able to null easily to within 5 arc seconds.

The performance of an embodiment of the present invention including use as an interferometer was determined at the HeNe wavelength with no field using the double pass model, and included at least the following evaluations: 1) WFE through AIT over focusing range and 2) fringe visibility for coated and uncoated optics. To perform the analysis, the location of the interference needs to be established. This location determines the start point of the common path optics, which does not require high performance. In the common path, the interferogram is only being relayed to the detector. Both the reference and test laser waves see the same aberrations, so a typical WFE of ⅓ wave RMS is acceptable. In the alignment interferometer telescope apparatus, the interference takes place at least in part at a location that is approximate to the hypotenuse in beam splitter 20 (shown in FIG. 1 and as discussed previously). For subsequent review, the hypotenuse is used as the 'image' location.

WFE through the alignment interferometer telescope apparatus over the focusing range was analyzed by overlapping the pupil image of the test laser wave with that of the reference laser wave. (One model was created with both the reference and test laser waves, and various embodiments of the present invention could do either or both, or additional combinations.) Interferograms as waveform error were created over the focusing range using the reference laser wave, instead of an ideal pupil, to interfere with the test laser wave. This technique resulted in actual performance WFE through the interferometer path. The following results were achieved.

| Interferometer WFE Results for an Embodiment of the Present Invention | | |
|---|---|---|
| Focus Range [mm] | PV [waves] | RMS [waves] |
| Infinity | 0.078 | 0.022 |
| 10,000 | 0.083 | 0.024 |
| 5,000 | 0.097 | 0.028 |
| 1,000 | 0.165 | 0.048 |
| 500 | 0.120 | 0.034 |
| 400 | 0.124 | 0.036 |
| Ref with Ref | 0.000 | 0.000 |

To determine the RMS value, a rule of thumb to convert PV to RMS was used.

$$RMS = \frac{PV}{\sqrt{12}}$$

This rule of thumb assumes that the surfaces were manufactured using standard fabrication techniques with surfaces having mostly low to mid spatial frequencies. Analysis based on the above table shows that the alignment interferometer telescope apparatus has good performance over its entire focusing range, and actually exceeds expectations. Most of the residual aberration was spherical with some defocus. The spherical aberration was expected since a spherical mirror was used to match the f/6.5 objective system. As the f-number increases (larger number) the residual spherical aberration goes as a function of the aperture squared for longitudinal and aperture cubed for transverse. Therefore, by increasing the f-number, and maintaining the same distance to the retro sphere, the aperture decreases and thus the spherical aberration decreases. Off-axis aberration is not applicable, since the system is used only on-axis.

The alignment interferometer telescope apparatus is designed for use with coated and uncoated optics along with reflective metal surfaces. Each one of these surfaces has different reflectance, so the internal retro sphere needs to also have variable reflectance to ensure good fringe visibility. To accommodate varying reflectance pellicle attenuation filters are to be used. An analysis was performed to determine the number of attenuation filters and their attenuation values. Fringe visibility is defined as Fringe Visibility $$V = \frac{I_{max} - I_{min}}{I_{max} + I_{min}}$$

When V equals zero, there is no loss in v. A parametric study was run with incremental reflectance values for both the test and reference paths. Through experience, a minimum value of 0.95 was used as the upper limit for the fringe visibility.

Figure 11:
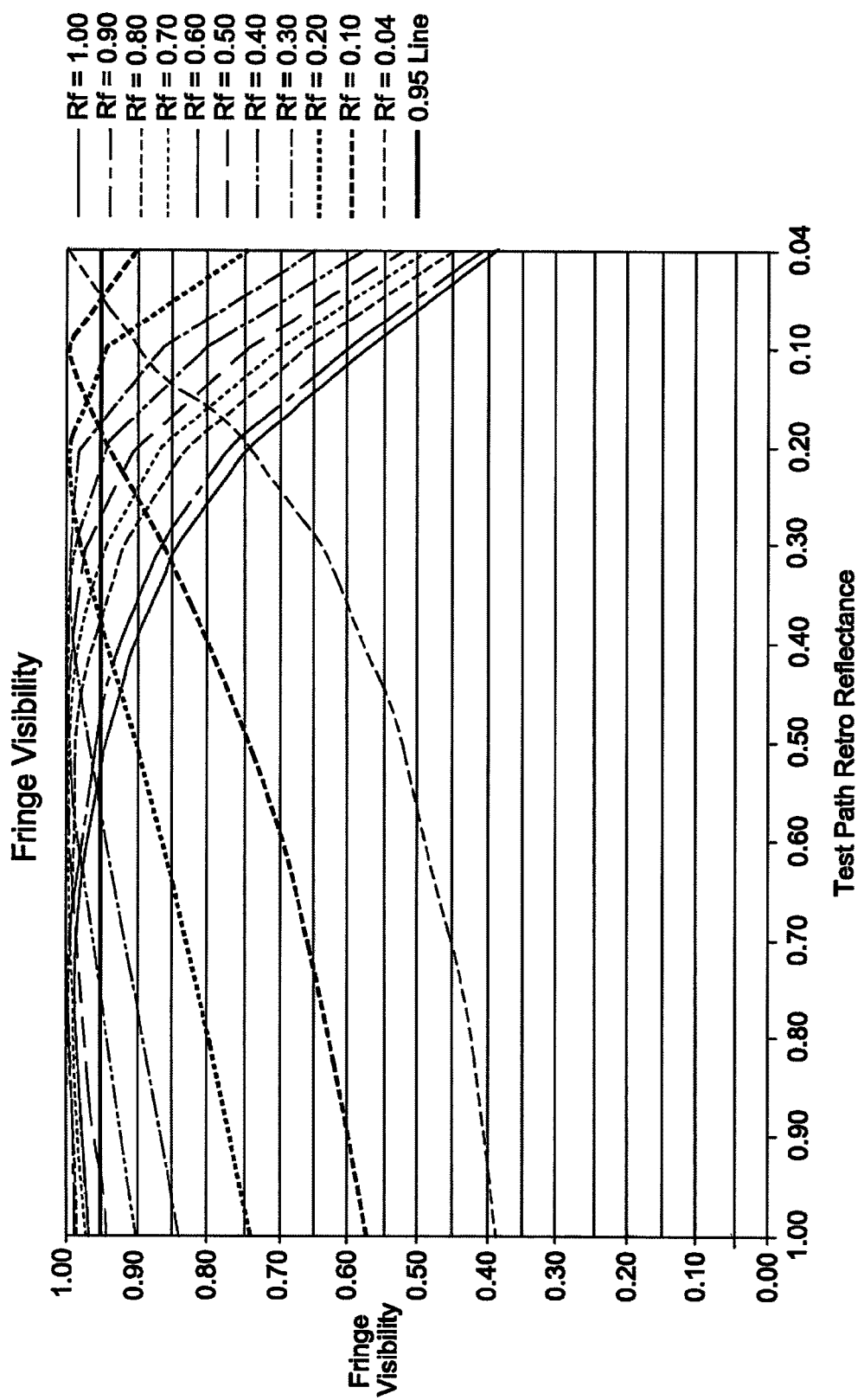
FIG. 11 is a graph of fringe visibility obtained using an exemplary embodiment of the present invention.

FIG. 11 shows the plot of the low-resolution parametric study. As shown in the Figure, the 0.95 limit, illustrated as a doted line, was used to determine the number of attenuation filters required. Bold lines show the attenuation filters. Four attenuation filters are required to span from 1.00 to 0.04. To fine-tune their values another parametric analysis was performed based on the 0.95 limit and the four chosen values.

Figure 12:
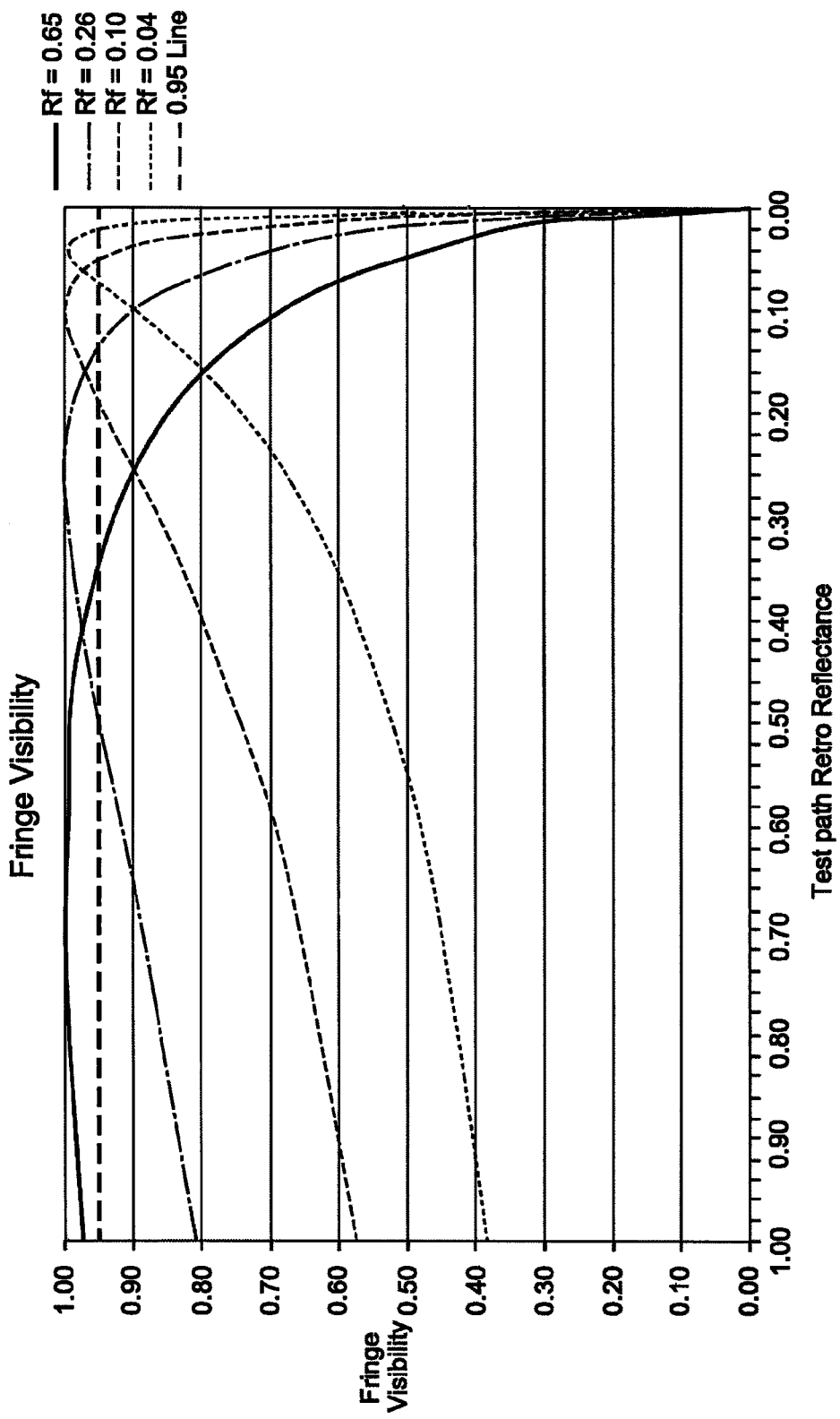
FIG. 12 is a graph of fringe visibility obtained using an exemplary embodiment of the present invention.

FIG. 12 shows the results after fine-tuning the attenuation values. The four attenuation values chosen are 0.65, 0.26, 0.10 and 0.04. These values also allow for overlap at their edges. Since it is easier to remove than increase the intensity, the internal reference spherical mirror has a protected aluminum coating with a reflectance value of 0.65. To achieve the other three values, coated pellicle reticles are used with half the values since this is a double pass system and take into account that the internal reference spherical mirror has a value of 0.65. The pellicle was chosen since it contributes very little WFE in the alignment interferometer telescope apparatus reference path design and is readily available. Plus, the diameter required is in the order of 12 mm, including mounting. Three attenuation filters plus an open hole can be easily mounted inside the alignment interferometer telescope apparatus on a wheel, as one of skill in the art would comprehend.

A sensitivity analysis was performed on the alignment interferometer telescope apparatus prior to developing an error budget. The purpose was to explore the interrelationship between the alignment telescope and interferometer paths, plus the determination of the most sensitive parameters. A standard set of parameters is seen below, and is based on a unit value of one. This standard set was used for each model to setup sensitivities.

| Parameter | Value |
|---|---|
| Lens Surface | |
| Surface RoC | ±1 mm |
| Thickness | ±1 mm |
| Decenter X | ±1 mm |
| Decenter Y | ±1 mm |
| Tilt X | ±1 Degrees |
| Tilt Y | ±1 Degrees |
| Irregularity | ±1 fringes |
| Index | ±1 NA |
| Abbe Number | ±1% |
| Lens Element | |
| Decenter X | ±1 mm |
| Decenter Y | ±1 mm |
| Tilt X | ±1 Degrees |
| Tilt Y | ±1 Degrees |

The performance criteria used was RMS WEF. Both alignment telescope and interferometer models include all configurations but no compensators. Overall their estimated RMS WFE changes were approximately the same; alignment telescope at 33.450 waves and the interferometer at 35.408 waves. Sensitive parameters for each model are listed in the following table.

| Sensitive Parameters | | | |
|---|---|---|---|
| Parameter | Surface | Alignment Telescope | Interferometer |
| Element Decenter in X | Relay Lens 3 | X | X |
| Element Decenter in X | Relay Lens 4 | X | X |
| Element Decenter in Y | Relay Lens 3 | X | X |
| Element Decenter in Y | Relay Lens 4 | X | X |
| RoC | IMG Lens 2 surface 1 | | X |
| RoC | Relay Lens 2 Surface 1 | X | X |
| RoC | Relay Lens 3 Surface 1 | X | X |
| RoC | Relay Lens 3 Surface 2 | X | X |
| RoC | Relay Lens 4 Surface 1 | X | X |
| RoC | Relay Lens 4 Surface 2 | X | X |
| Surface Decenter in X | Relay Lens 3 Surface 2 | X | X |
| Surface Decenter in Y | Relay Lens 3 Surface 2 | X | X |
| Surface Tilt in X | OBJ Lens 2 Surface 1 | X | |
| Thickness | IMG Lens 1 surface 1 | | X |
| Thickness | Relay Lens 2 Surface 2 | X | X |
| Thickness | Relay Lens 3 Surface 1 | X | X |
| Thickness | Relay Lens 3 Surface 2 | X | X |

In general, the above table shows that the alignment telescope and interferometer have mostly the same sensitive parameters. This is reasonable since both share a common optical path except for the interferometer including the addition of the pupil imaging system 130 (shown in FIG. 1). For the interferometer, the sensitivity analysis was based on image performance not creating the interferogram, and then imaging it in the common path optics of the relay 100 and pupil imaging system 130. The interferometer is also a double pass design that effectively doubles the WFE created by the optical system. Therefore, a new set of parameters taking into account just the objective system may be used for the interferometer's tighter requirements. The alignment telescope may be used with the objective system's error budget to obtain the relay system's error budget. The pupil imaging system 130 utilized the interferometer model's parameters.

The error budget is used to determine the manufacturability of the optical system. The results are error budget values for each optic and subsystem. These values include the combined effects of fabricating the optics, mechanical part fabrication, assembly and alignment tolerances, environmental conditions, and reserves. Initially, a standard set of parameter values were used. These values were adjusted to take advantage of sensitive and non-sensitive parameters. The goal was to have as loose an error budget as possible for each optical component while maintaining a build yield of 90% or better.

Focus compensation was incorporated into the error analysis since the system is adjustable using the secondary lens. One hundred Monte Carlo runs were used to acquire the statistics. Based on various interferometer requirements, typical 90% values require a PV WFE of $\lambda/5$ (0.2 waves) or better in double pass. Using only the objective system the error budget analysis was performed. The technique was an iterative process that began with standard optical/mechanical tolerances as shown in the below table. After each tolerance run, the values were adjusted based on the 10 worst offenders and rerun.

| Starting Error Budget Parameters | |
|---|---|
| Parameter | Value |
| Lens Surface | |
| Surface RoC | ±3 fringes |
| Thickness | ±0.25 mm |
| Decenter X | ±0.1 mm |
| Decenter Y | ±0.1 mm |
| Tilt X | ±0.016 Degrees |
| Tilt Y | ±0.016 Degrees |
| Irregularity | ±0.5 fringes |
| Index | ±0.001 NA |
| Abbe Number | ±1% |
| Lens Element | |
| Decenter X | ±0.1 mm |
| Decenter Y | ±0.1 mm |
| Tilt X | ±0.016 Degrees |
| Tilt Y | ±0.016 Degrees |

The final build yield of 90% or better resulted in a statistical PV WFE of 0.197 waves, meeting the self-imposed requirement of 0.2 waves. These values were inserted next into the alignment telescope model including the relay lens and used to determine the error budget for the relay system. The starting point for the relay lenses was the same as with the objective system. Self-imposed requirements were for the alignment telescope to have within a combined error budget of $\lambda/3$ RMS WFE (1.155 waves PV). After the initial run, the performance was within stated requirements with residual error for the eyepiece, so no further iterations were performed. The statistical performance was 1.131 waves PV WFE meeting the self-imposed requirement of 1.155 waves PV. A residual PV WFE allocated for the eyepiece was 0.024 waves. This is a direct subtraction that is a worst-case scenario since aberrations usually do not have their peaks in the same location.

With the alignment telescope system completed, the interferometer pupil imaging module was analyzed for its error budget. The pupil system 130 is in common path, after the interferogram has been created; therefore its requirement for overall WFE is 1 wave PV to meet the 90% or better manufacturing yield. Using the same error budget and technique as established for the objective and relay system, the pupil imaging system 130 was analyzed. The initial run of 0.893 waves PV was well below the WFE requirement, so the iteration process was used but with loosening the tolerances. Only one parameter was loosened at a time so that the effect on the WFE could be ascertained. After several iterations, the resulting statistical PV WFE of 0.870 waves was achieved. This value is substantially below the required 1 wave for better than 90% yield. But after multiple iterations of loosening up of the tolerances to over 3× their original values, it was determined that the pupil imaging lenses are not sensitive. Mass production values can be applied to its entire error budget.

Reference spherical mirror error budget was created separately since the only powered optic is the reference sphere itself. Its error budget was run on a separate model with the self-imposed requirement of 1/5 PV. As expected, it was insensitive to almost all parameters. A spherical surface has no axis and thus tilting and de-centering have no effect. Change in RoC results in a slightly different f-number. The only sensitive parameter is the surface figures irregularity that shows up as WFE. Only this parameter needs to be maintained. The rest are restricted by the mechanical mounts travel range.

A ghosting analysis was performed to determine if the optical design would have unwanted images forming at the focal and pupil surfaces. Ghost images either appear as washed out, non-focusing, returns or as sharp images that confuse the operator as to which is the correct return. In the interferometer, another issue with ghost images is the overlap of spurious fringes that interfere with the true fringes giving misleading or non-readable fringe patterns. Using the alignment telescope and interferometer models already created, the ghost analysis was run. Parameters for the analysis included all surfaces that have a glass to air interface, all configurations, all wavelengths and all fields. The requirements were that the resulting ghost image spot size be at least 10 times larger than the nominal and at least 100 times dimmer.

With all of the surfaces having Anti-Reflective (AR) coatings, the maximum relative ghost intensity would be 0.01%, based on a conservative 1.0% AR coating. Ghost analysis shows that none of the ghost reflections image back at the image/pupil surface. All of them fall out of the optical path resulting in background scatter, or a light noise DC offset.

To simplify the AIT assembly it is divided into 6 subsystems that are generally labeled in FIG. 2: 1) alignment telescope objective system; 2) beam splitters; 3) interferometer reference path; 4) relay system and beam splitter; 5) pupil imaging system with camera; and 6) eyepiece. Each subsystem is assembled separately then integrated in the order as laid out above. The tightest tolerance subsystem is the alignment telescope objective system. It requires that the optical and mechanical axes maintain alignment over the entire focusing range.

The assemble of the alignment telescope objective system is further divided into three stages 1) mounting of the lenses; 2) integrating the lenses into the barrel; and 3) attaching the secondary lens mechanical components. Each module consists of an air spaced doublet, one for the objective and secondary.

First the empty cell is aligned on an air bearing table and centered to an optical reference beam. Then the first lens (for example, lens 80 of FIG. 1) is inserted and centered to the optical axis by rotating the lens and adjusting by translating the lens. After the lens is centered it is held in place with an elastomer in dots around the circumference. With the lens secured, a spacer is inserted, and the second lens 90 is installed using the same technique as the first.

With both the objective and secondary lenses mounted in their cells, they are integrated into a barrel housing (not shown). The barrel is mounted onto the air bearing and aligned to the optical reference beam. After it is aligned the objective lens 80 is inserted. Adjustment screws position the lens to the center of the optical axis and then it is secured. With the objective lens 80 secured, the secondary lens 90 is inserted into the barrel. The secondary lens 90 is aligned as the objective lens 80 over its entire travel range. Once the secondary lens 90 is aligned to the optical axis, it is secured in place. To finish out the objective assembly, mechanical hardware for adjusting the secondary lens 90 is installed.

The integration of the beam splitter 20, 60 assembly into the barrel is next. By including the beam splitters 20, 60 in the barrel, the optical and mechanical axes can be maintained. Openings in the barrel allow the different optical paths clear access to the beam splitters 20, 60. Prior to integration into the barrel, the beam splitters 20, 60 and the retro sphere reference spherical mirror 30 are mounted in a subassembly. The cemented beam splitters 20, 60 are first mounted into the subassembly and aligned using mechanical tolerances.

Afterwards, the mounted beam splitters 20, 60 are placed in front of an f/18 focusing interferometer, focused onto the beam splitter surface. The centering is determined by mechanical alignment. Integration of the spherical mirror and its attenuation wheel is next onto the subassembly. It is adjusted until its retro beam aligns with the f/18 beam. Fine adjustment is performed to null the fringe pattern. The reticle 70 is then installed onto the beam splitter surface.

Adjustments are made to the reticle 70 housing until the crosshair pattern is aligned to the microscopes optical axis. This alignment is preliminary to allow quicker alignment after the subassembly is integrated into the barrel. The beam splitter 20, 60 assembly is integrated into the barrel which is still mounted and aligned on the air bearing table. Again the barrel is rotated and the return images from the beam splitter 20, 60 are aligned to the optical axis, using beam splitter subassembly adjusters. Next the reticle 70 crosshair is aligned to the optical axis by focusing onto it with the optical axis system. The reticle 70 and beam splitter 20, 60 subassemblies are fixed in place and the alignment interferometer telescope assembly continues with the alignment of the reference spherical mirror 30.

Integration of the retro sphere/reference spherical mirror 30 was performed with the beam splitters 20, 60 but the mirror was not aligned. To align the reference spherical mirror 30, the optical axis beam is again focused onto the surface of the reticle. The reference laser wave returns from the reference spherical mirror 30 and is aligned to it. After it is aligned, it is secured in place or to allow adjustments by the user, its adjustment actuators locations are set to zero.

Light source 40 is integrated next. An exemplary embodiment of the present invention uses a small incandescent bulb with a green filter. The small bulb is designed so that a high intensity light source can be inserted in place of the incandescent bulb. A SMF fiber is attached to the mounting for the interferometer light source. Adjusting the fiber until the return image goes back into the optical axis system that is still focused and centered on the crosshair reference reticle 70 and the SMF fiber itself performs alignment. The fiber is then locked in place.

With the precision barrel assembly complete, it can be removed from the air bearing and placed on a bench top for final optical integration. The relay system 100 and beam splitter 20, 60 are assembled separately on a bench using mechanical tolerances. The same are then attached to the barrel. Focus and centering is achieved by viewing the reference crosshair pattern. A tooling reticle at the location of the eyepiece is used as an alignment aid to align the beam splitter 20, 60. The relay system 100 except the beam splitter 20, 60 is now secured in place.

Integration continues with the pupil imaging system 130 and camera 140. Like the relay system 100, the pupil imaging system 130 and camera 140 are aligned using mechanical tolerances. Pupil focus is verified by turning on the HeNe laser, then placing an optical flat in front of the alignment interferometer telescope, and aligning the interferometer path with several fringes as one of skill in the art would comprehend. The resulting interferogram is imaged onto the camera 140. Focus and magnification is adjusted by moving the camera 140 and/or the pupil imaging 130 optics system.

In order to be able to attach the eyepiece and perform final alignment to the pupil imaging system 130, the back housing is installed (not shown). It is designed to be integrated from the back end of the barrel. Therefore, in an exemplary embodiment of the present invention, all of the pre-mentioned subassemblies are required to be smaller in diameter than the barrel, except for the reference spherical mirror 30. A cutout in the housing may allow the housing to slip around the reference spherical mirror 30. This cutout gives the user accessibility to adjustment screws at the reference spherical mirror. A side lid with a metal cover allows access for all of the following integrations and alignments and protects the internal optics.

Next, the secondary lens 90 adjustment knob mechanical linkage is integrated and tested. All of the fiber and electrical connections are attached to the housing. Integration of the eyepiece 120 and final alignment is performed. The housing has a fixed threaded hole for the eyepiece to attach to. Alignment of the beam to the eyepiece is done via the relay optical system beam splitter 110. Adjustments are made to align the crosshair reference reticle 70 to the center of the eyepiece. After the eyepiece is adjusted, the pupil imaging system 130 is adjusted to adjust for any translations due to beam splitter 20, 60 motions. Then the relay system beam splitter 20, 60 and pupil imaging system 130 and camera 140 are fixed in place.

Final assembly verification is performed by testing the alignment interferometer telescope apparatus on a series of predetermined targets and retro reflectors at specific distances. The barrel is rolled inside of a mounting fixture to test that the optical and mechanical axes meet requirements. Following the previous, the alignment interferometer telescope apparatus is ready for use.

Exemplary embodiments of the present invention were tested in various fashions including the following. All of the optics and mounts were collected and assembled on a 4×8 foot optical table. The lenses were mounted in Newport mounts. On the sides of each lens mount, the lens part number was recorded along with the lenses orientations. An alignment telescope (D275) was used to align the lenses onto a Newport sliding rail system.

To align the optics to a central gut ray, an iris was positioned at close and far locations on the slide. The alignment telescope was aligned to the irises using the 50/50 technique. At the close location, translation was used, and at the far location, angle was used. After a few iterations the alignment telescope was aligned to the slide. A layout of the previous is shown in FIG. 3, where the objective lens is located to the left of the illustration, a test laser wave path 320 and a reference laser wave path 370 travel along two different axis and meet in perpendicular fashion, the beam splitter 330 sits at the juncture of the two laser wave paths 320, 370, the secondary lens rests to the left of the beam splitter 330, the reference spherical mirror 350 sits behind the beam splitter in reference to the interferogram 380, and the laser source 360 is located generally to the right of all the previous and is providing a laser wave to the beam splitter 330.

Figure 3:
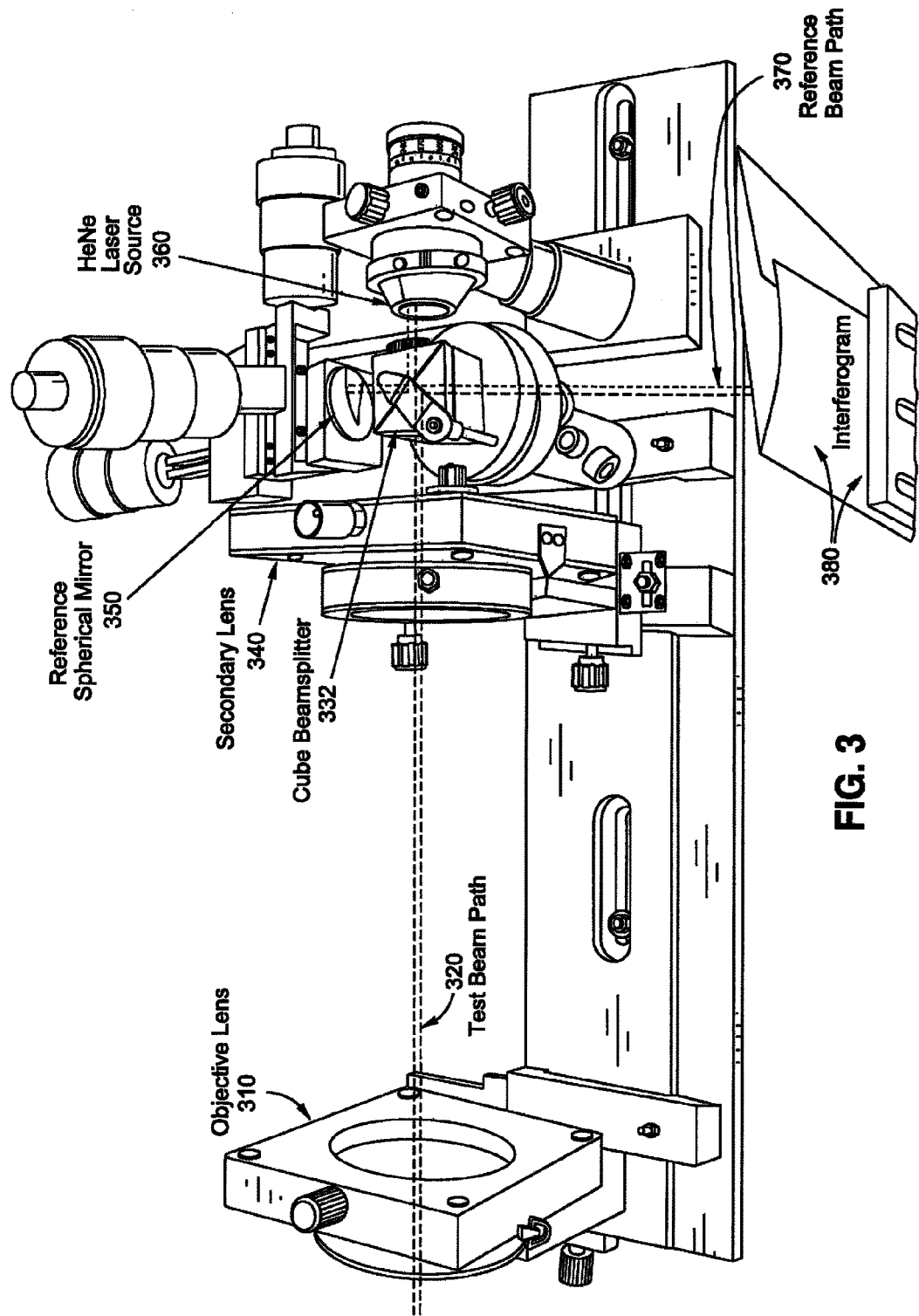
FIG. 3 illustrates an exemplary alignment interferometer telescope as a lab setup in accordance with an embodiment of the invention.

In assembling the components shown in FIG. 3, the secondary lens 340 was attached to the rail and aligned first. Retro reflections from the lens 340 were used to align it in tip/tilt and XY de-center. A slide test was performed to verify error in alignment over the secondary travel range. Angular error of less than 1 arc minute and de-center error less than 0.1 mm was observed. These misalignments changed the WFE in the model by less than 0.005 PV, which is undetectable by the human eye. Next the objective lens 310 was aligned using the same technique. Afterwards both of these lenses 310, 340 were removed and the rail was laid out with the positions for each optic based on the infinity object optical prescription. First the secondary lens 340 was positioned onto the rail to allow room for all of the other optics and their mounting. Then the beam splitter 330 was located at 35 mm away from the secondary lens 340 using a steel ruler. A SMF was connected to the HeNe laser generator and the other end positioned 25 mm behind the beam splitter 330. Optimum location of the objective lens 310 was determined by looking at the output beam with a shear plate. Once the location was found for infinity focus, the objective lens 310 was locked down and the location of the secondary lens 340 marked.

Figure 4:
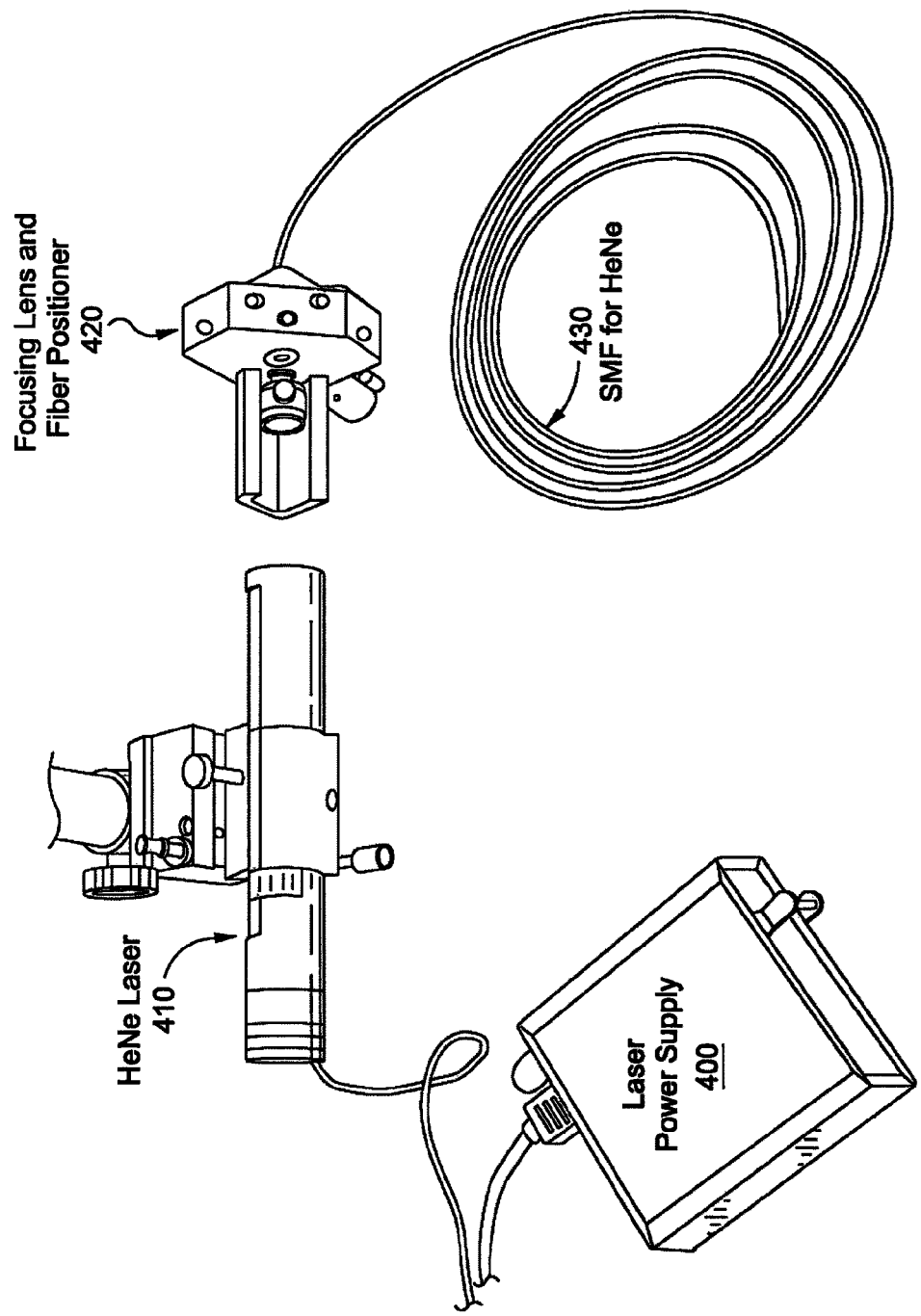
FIG. 4 illustrates exemplary components for an exemplary alignment interferometer telescope apparatus in accordance with an embodiment of the invention.
Figure 5:
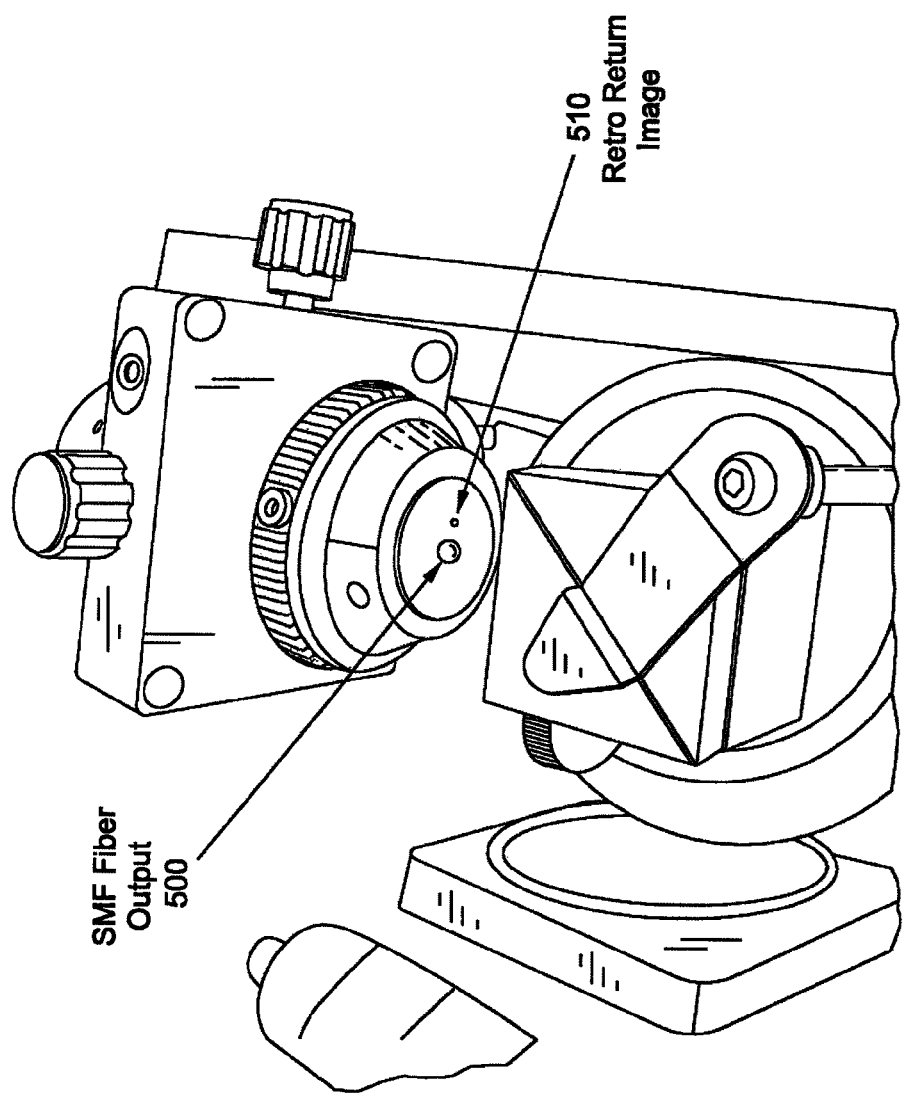
FIG. 5 is a picture of exemplary components for an alignment interferometer telescope apparatus in accordance with an embodiment of the invention.

FIG. 4 shows exemplary components used for focus adjustment. Focus adjustment is performed by moving the secondary lens 330 between the beam splitter 340 and objective lens 310. For infinity focus the secondary lens 330 is positioned close to the beam splitter 340 and at near focus it is positioned towards the objective lens 310. A visual test of the lab setup being used as an alignment telescope was performed with the laser generator turned off.

Referring to FIG. 1, illuminated objects were viewed through an eyepiece 120 by being held where the interferogram is projected out of the beam splitter 20, 60. Different secondary mirror positions were used to view objects from 500 mm to infinity that were placed around the lab in a straight line. Each object could be focused onto and was viewed with no discernable aberrations.

To test the interferometer portion of the AIT, the laser generator was turned on and a flat mirror was positioned in front of the objective lens. It was adjusted in tip and tilt until the laser beam return spot was aligned to the outgoing laser beam emanating from the SMF fiber. This was easy to visually align since the holder for the SMF fiber has a large mounting surface, as seen in FIG. 5. The retro image was viewable with the unaided eye, as noted by element 510 in FIG. 5.

Figure 13:
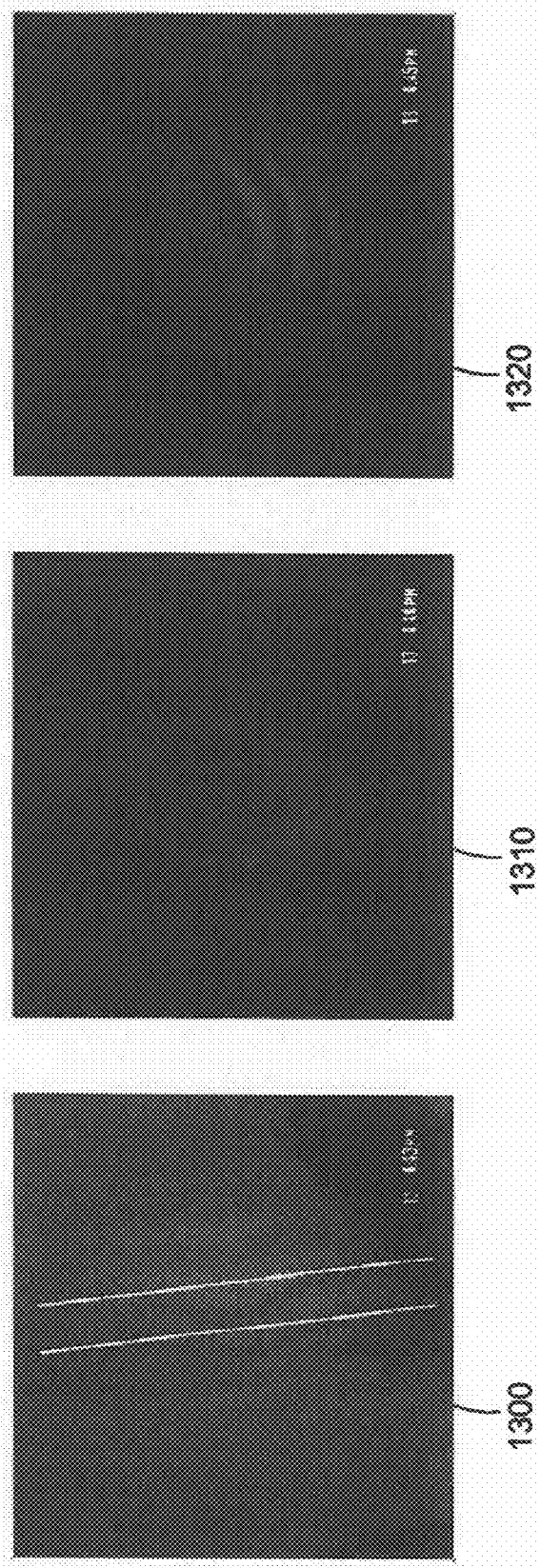
FIG. 13 illustrates fringe visibility obtained using an exemplary embodiment of the present invention.

With the test path aligned, the built in reference spherical mirror 30 (as shown in FIG. 1) was adjusted for alignment using the same process. The mirror 30 was adjusted using translation to return its retro image onto the same spot on the SMF fiber 500 (shown in FIG. 5). In addition to position, it was also aligned in piston. To correct piston the interference pattern was viewed as shown in FIG. 13. Alignment was correct when the null fringe was achieved. The interference pattern was clean and easily viewable with the unaided eye, with vertical fringes shown as element 1300, null fringes shown as element 1310, and horizontal fringes shown as element 1320. Note that the straight fringes show a bump at the center and the null has 1 fringe of residual error. This spherical aberration is predicted. To determine the amount of spherical aberration, we use the following equation.

$$FE = \frac{\lambda}{2}\frac{\Delta}{S} = \frac{0.6328 \ \mu m}{2}\frac{7}{8} = 0.277 \ \mu m PV$$

The amount of spherical aberration calculated from in the optical model is therefore:

SA=0.2739λ=0.173 μmPV

The difference between the predicted and the test is due to the addition of the error stemming from the internal reference spherical mirror 30 (FIG. 1).

A test was performed to verify that the secondary lens could be used to set the focus for retro returns off of spherical surfaces. Approximately 740 mm in front of the objective lens, a concave interferometer retro sphere was inserted into the beam path. This secondary mirror was adjusted in position towards the objective lens for best focus of the retro image at the SMF fiber. Afterwards the retro dot was aligned to the reference spherical mirror's (FIG. 1, element 30's) dot. Adjustment of the retro dot may be performed by translating the concave interferometer retro sphere, and not the internal retro sphere. Note that with a spherical surface there is no defined axis; therefore translation and tip/tilt are the same in terms of adjustments. The only concern is vignetting of the beam. With the two dots overlapped the interferogram image was evaluated. This process is the standard two-dot alignment technique that is used on many interferometers.

Figure 14:
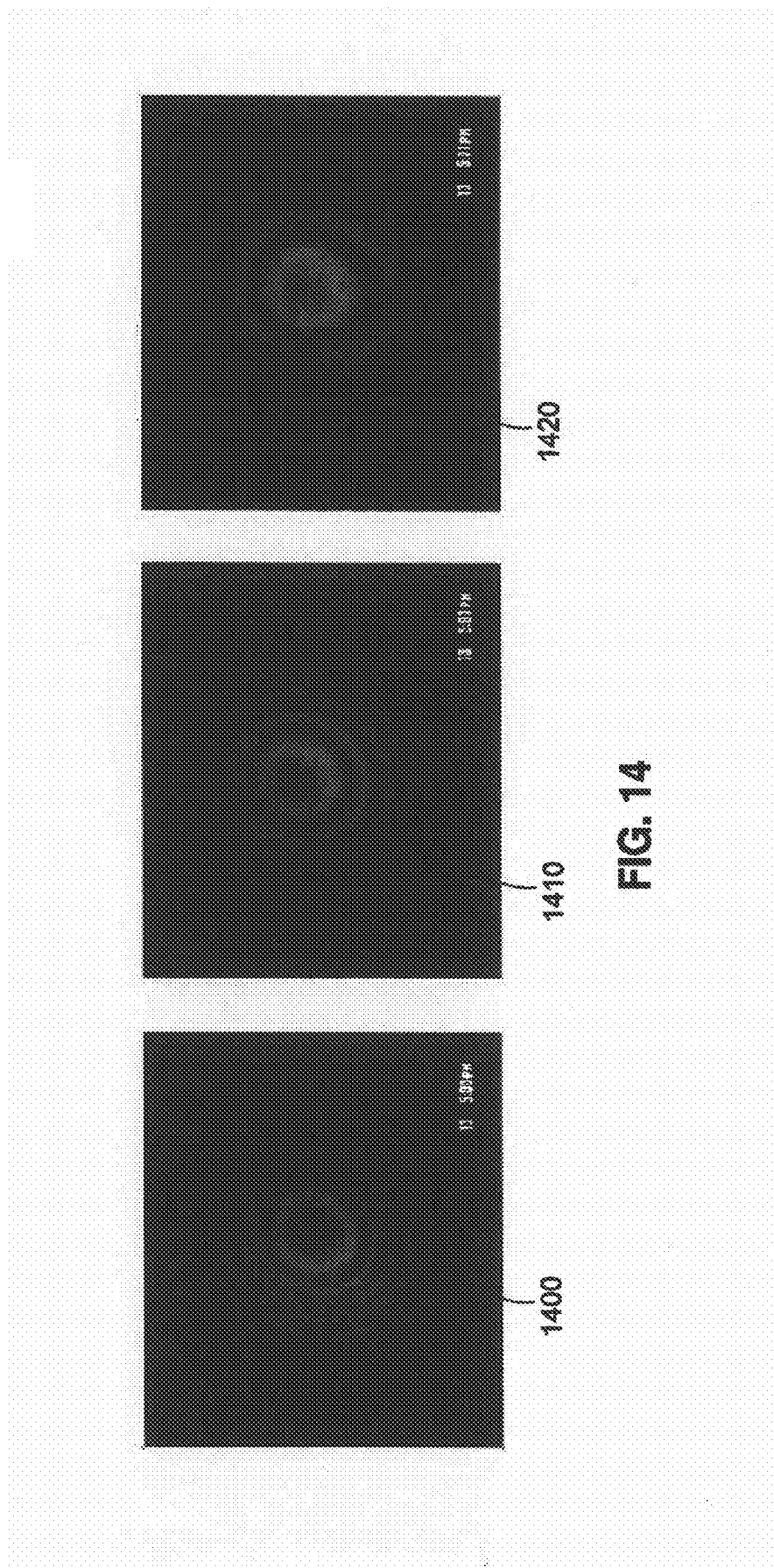
FIG. 14 illustrates fringe visibility obtained using an exemplary embodiment of the present invention.

At this point, circular fringes were visible, such as those shown in FIG. 14. Circular fringes signify that the test path is not at the best focus. All adjustments were performed using a Zygo mount. The alignment interferometer telescope apparatus's retro sphere was not adjusted since doing so would induce errors in the reference path and take the system out of infinity focus. By adjusting the Zygo mount the fringes were feathered out till three to five fringes were visible. This number of fringes is easy for the eye to see and deduce the WFE. The residual spherical aberration is visible at best focus. Element 1400 shows 7 fringes out of focus, element 1410 shows 5 fringes out of focus, and element 1420 shows a preferred focus.

Figure 15:
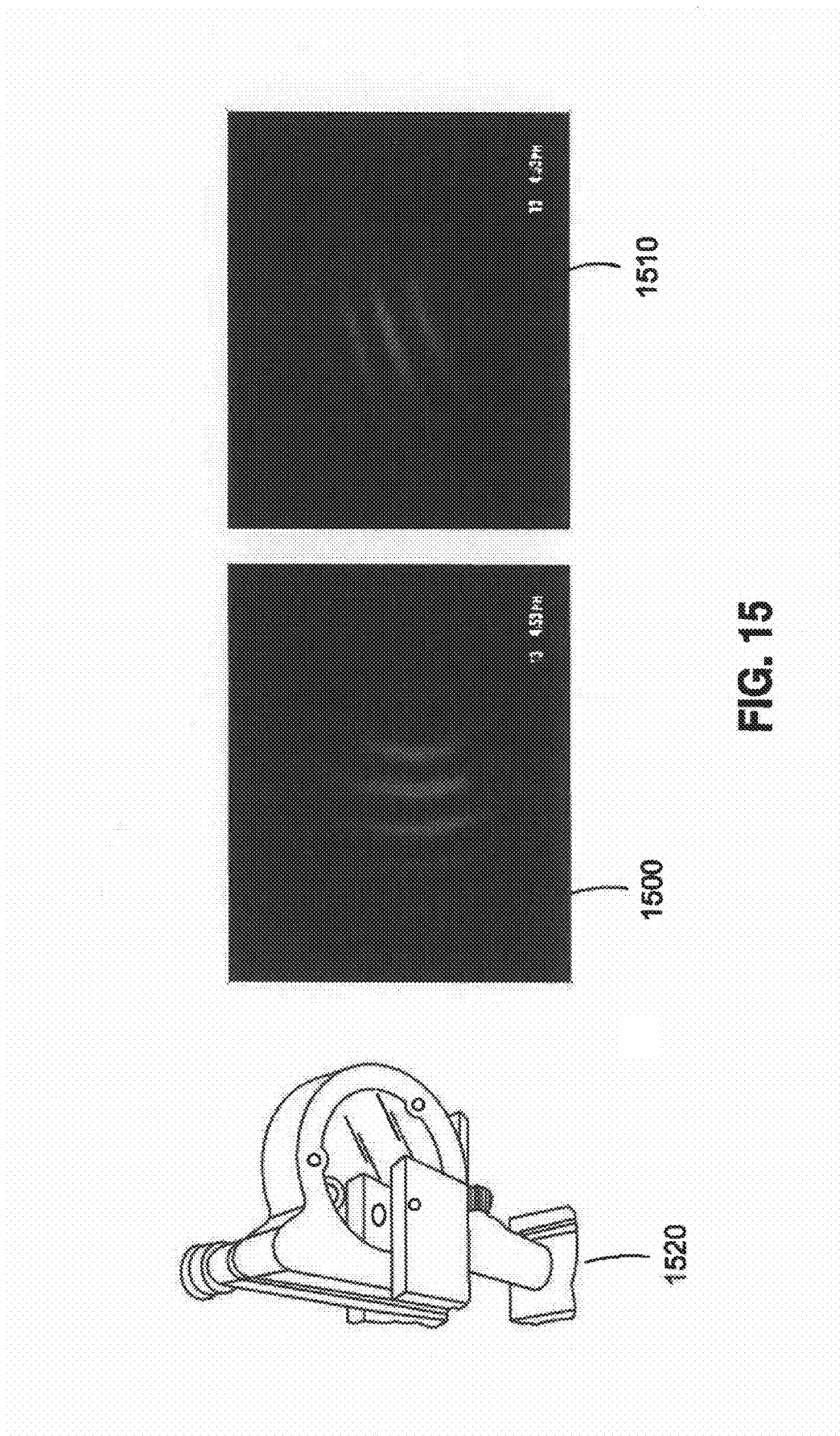
FIG. 15 illustrates fringe visibility obtained using an exemplary embodiment of the present invention and an aspect of some of the equipment used in an embodiment of the present invention to acquire the pictures of fringe visibility.

Another test was performed that retro reflected the focus spot off of a flat mirror. In this configuration, the rays are flipped after being reflected, as illustrated in FIG. 15. The top becomes the bottom and vise versa. To setup the test, the mirror was positioned 1 meter in front of the objective lens. Using the secondary mirror, the focus was imaged onto the mirror. Mirror adjustments were used to align the retro beam with the reference beam dot. The fringe pattern showed that the WFE had decreased. This was expected since the rays are reversed resulting in a cancellation of the errors. Element 1520 of FIG. 15 shows a retro mirror with laser spot, element 1500 shows vertical fringes, and element 1510 shows horizontal fringes.

The previous lab test of the alignment interferometer telescope apparatus shows that the instrument works as both an alignment telescope and an interferometer, and that the operational concept is correct.

Additional aspects of embodiments of the present invention may include the following, whether taken individually, in part, or collectively. One aspect includes an adaptor that slips over the end of the housing barrel as an aid in alignment and to set a visible line of sight. The adaptor may consist of a visible laser diode that projects a collimated pencil beam that is close to the alignment of the optical axis. Batteries built into the adaptor supply power. For aligning mirror systems, the retro return beam may adjust to overlap the outgoing beam. The adaptor is then removed and the mirror's retro return would be visible in the alignment interferometer telescope apparatus. The beam gives a visible representation of the alignment interferometer telescope apparatus's optical axis for aid in aligning objects at great distances.

For interferometer aspects, three additional concepts are presented. First, by using a laser diode, the bulky, external HeNe laser and associated fiber delivery system and power supply may be eliminated. The laser diode may be mounted inside the alignment interferometer telescope apparatus's housing along with drive electronics. A mounting compartment on the side of the MT allows user access. This access provides for changing of the laser diode wavelength by inserting a separate laser diode module.

An insertable notch filter may also be used at the eyepiece to eliminate laser damage to the eye. The notch beam splitter may be replaced with a 50/50 style. Further, a short coherence length laser may be used to eliminate spurious fringe patterns from the optics under test and the beam splitter cemented interfaces. This also allows greater flexibility in laser diode selection since odd wavelength devices have short coherence lengths. Using such lasers may require a delay line for interference in the reference path.

To accommodate a required path length, a collimating system with a small diameter beam may be used to allow it to fit in the AIT body. A multiple fold system with squiggle motor actuators may adjust the delay line. To determine the correct delay line path length, a pop in focusing lens may be used. The operational concept would be to adjust the fringes until null fringe is achieved. For longer path lengths, plug in fiber delay lines may be attached to the side of the alignment interferometer telescope apparatus. Additionally, spatial carrier frequency phase shifting software could be incorporated to accurately measure the optic under test performance. The manual adjustments on the reference spherical mirror may be used to induce approximately one wave per four pixels on the camera. Using just one camera frame capture, the wavefront including phase can be accurately calculated and displayed.

The design, assembly, and operational usage of the alignment interferometer telescope apparatus has been demonstrated and analyzed. Based on the previous the alignment interferometer telescope apparatus has been shown to function as described above. Further, each of the following self-imposed requirements has been addressed and is met or exceeded. The below table shows self-imposed requirements for an exemplary embodiment of the present invention (such as those elements shown in FIG. 1). While the table shows various requirements, the stated requirements apply in the strictest sense only to an exemplary embodiment of the invention. One skilled in the art would comprehend that other embodiments could be utilized to practice the present invention, and that the other embodiments would utilize at least some varied requirements along with perhaps some of the requirements listed in the below table.

| Requirement | Requirement | Units | Verification Method Design | Units |
|---|---|---|---|---|
| Optical System [Alignment Telescope & Interferometer] | | | | |
| Near Focus in Front of Objective Lens | 406.4 | mm | 400 | mm |
| Far Focus in Front of Objective Lens | infinity | NA | Infinity | NA |
| Clear Aperture at Objective Lens | ≧35 | mm | 35 | mm |
| No Ghosting the Interferes with the System's Performance | Yes | NA | Yes | NA |
| Alignment Telescope | | | | |
| WFE (single pass from object to eyepiece over field) | $\lambda/3$ RMS ($\lambda$ = all wavelengths) | nm | 0.12 | waves |
| F/# (through focusing range) | 18-23 | NA | 7 | NA |
| Path 1: Object to Eyepiece | Yes | NA | Yes | NA |
| Path 2: Projected Reticle to Retro Surface to Eyepiece | Yes | NA | Yes | NA |
| Spectral Bandwidth | 500-650 | nm | 486-656 | nm |
| Adapter for Color Filter | Yes | NA | Yes | NA |
| Full Field of View | ≧1 | Degree | 1 | degree |
| Null | <5 | arc seconds | <5 | acr seconds |
| Interferometer | | | | |
| WFE (reference to test path) | ≦$\lambda/5$ PV ($\lambda$ = 633 nm) | nm | 0.05 | waves |
| Spectral Bandwidth | 633 | nm | 633 | nm |
| Path 1: Source to Reference Retro Sphere to Camera | Yes | NA | Yes | NA |
| Path 2: Source to Retro Surface to Camera | Yes | NA | Yes | NA |
| Fringe Visibility for 4 - 100% Reflection | 0.25 | NA | <0.25 | NA |
| Full Field of View | 0.001 | Degree | 0.001 | degree |
| General | | | | |
| Interferometer Null Fringe | On-Axis | NA | Yes | NA |
| Polarization | NA | NA | NA | NA |
| Camera Adapter for Eyepiece | Yes | NA | Yes | NA |
| Interferometer 2 Dot Alignment via Alignment Telescope Alignment | Yes | NA | Yes | NA |
| Overall Length | ≦650 | mm | 580 | mm |
| Barrel Length | ≦360 | mm | 330 | mm |
| Barrel Diameter | 2.24966 ± 0.00025 | inches | 2.24966 ± 0.00025 | inches |
| Optical Axis Concentric with Barrel (at 16 inches) | ±0.0003 | inches | ±0.0003 | inches |
| Camera for Interferometer | Yes | NA | Yes | NA |
| Housing Material | Metal | NA | Metal | NA |
| Lens & Beamsplitter Material | Glass | NA | Glass | NA |

As described above, it is possible to implement some aspects of the present invention as a method and/or in a computer system. The computer system may include a bus or other communication mechanism for communicating information, and a processor coupled with the bus for processing information. The computer system may also include a memory coupled to the bus for storing information and instructions to be executed by the processor. The memory may also be used for storing temporary variables or other intermediate information during execution of instructions by the processor. The computer system further may also include a data storage device, such as a magnetic disk or optical disk, coupled to the bus for storing information and instructions. The computer system may be coupled to a display device for displaying information to a user. An input device, such as, for example, a keyboard or a mouse may also be coupled to the computer system for communicating information and command selections to the processor.

According to some embodiments of the present invention, selective adjustment of a pupil image and/or a reticle may be performed utilizing software, an algorithm, a processor, and/or a computer system in response to an output of a processor executing one or more sequences of one or more instructions contained in a memory. Such instructions may be read into the memory from a machine-readable medium, such as a data storage device.

A Masters of Science thesis by Paul F. Schweiger, entitled *Design of an Alignment Telescope with a Built-In Interferometer*, University of Arizona College, Optical Sciences Program, 2007, is hereby incorporated by reference in its entirety for all purposes. The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

It is understood that the specific order or hierarchy or steps in the processes disclosed herein is an illustration of exemplary approaches. Based upon design preferences, it is understood that the specific order or hierarchy of steps in the process may be re-arranged. Some of the steps may be performed simultaneously. The accompanying method claims present elements of the various in a sample order and are not meant to be limited to the specific order or hierarchy presented.

A reference to an element in the singular is not intended to mean "one and only one" unless specifically stated, but rather "one or more." The term "information" derived from a radio frequency signal may include data (e.g., audio, video, multimedia, instructions, commands, or other information). The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for a telescope, the method comprising:
producing a coherent laser wave;
splitting the coherent laser wave into a reference path laser wave and into a test path laser wave;
transmitting the test path laser wave to an object outside the telescope;
receiving the test path laser wave at an interference location within the telescope upon reflection from the object;
reflecting the reference path laser wave to the interference location;
combining the reference path laser wave and the test path laser wave to produce a combined laser wave;
producing a light;
projecting an image from a first reticle with the light;
transmitting the projected image to the object;
receiving the projected image at a second reticle; and
superimposing the projected image with a reference image from the second reticle.

2. The method of claim 1, further comprising:
producing a first pupil image for the reference path laser wave, the first pupil image being based on the combined laser wave and the reference path laser wave; and
producing a second pupil image for the test path laser wave, the second pupil image being based on the combined laser wave and the test path laser wave.

3. The method of claim 1, further comprising selectively adjusting at least one of the first reticle and the second reticle to align the telescope.

4. The method of claim 1, further comprising selectively adjusting at least one of the first pupil image and the second pupil image to align the telescope.

5. The method of claim 1, further comprising selectively adjusting at least one of the first reticle and the second reticle and at least one of the first pupil image and the second pupil image, to align the telescope.

6. The method of claim 2, further comprising imaging the first pupil image and the second pupil image at a viewing plane.

\* \* \* \* \*

UNITED STATES PATENT AND TRADEMARK OFFICE
CERTIFICATE OF CORRECTION

PATENT NO. : 7,929,150 B1 Page 1 of 1
APPLICATION NO. : 12/901462
DATED : April 19, 2011
INVENTOR(S) : Paul Schweiger It is certified that error appears in the above-identified patent and that said Letters Patent is hereby corrected as shown below:

Column 24, Line 58: Replace "0.005 PV", with -- 0.005 $\lambda$ PV --

Signed and Sealed this
Twenty-fifth Day of October, 2011

David J. Kappos
*Director of the United States Patent and Trademark Office*